US010959274B2

(12) United States Patent
Von Dentz et al.

(10) Patent No.: US 10,959,274 B2
(45) Date of Patent: Mar. 23, 2021

(54) METHODS AND APPARATUS TO IMPROVE BLUETOOTH LOW ENERGY STREAMING CONNECTION EFFICIENCY

(71) Applicant: Intel Corporation, Santa Clara, CA (US)

(72) Inventors: Luiz Von Dentz, Espoo (FI); Marcel Holtmann, Kirchlengern (DE); Xuemei Ouyang, San Jose, CA (US); Oren Haggai, Kefar Sava (IL); Chethan Tumkur Narayan, Bengaluru (IN); Harish Balasubramaniam, Cupertino, CA (US); Robert Hughes, Tualatin, OR (US); Denis Kenzior, Manchaca, TX (US); Hakan Magnus Eriksson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/135,983

(22) Filed: Sep. 19, 2018

(65) Prior Publication Data
US 2019/0098678 A1 Mar. 28, 2019

(30) Foreign Application Priority Data

Sep. 26, 2017 (IN) .............................. 201741034135

(51) Int. Cl.
*H04W 4/80* (2018.01)
*H04W 76/11* (2018.01)
(Continued)

(52) U.S. Cl.
CPC ............. *H04W 76/11* (2018.02); *H04L 67/14* (2013.01); *H04L 69/24* (2013.01); *H04W 4/50* (2018.02); *H04W 4/80* (2018.02); *H04W 84/12* (2013.01)

(58) Field of Classification Search
None
See application file for complete search history.

(56) References Cited

U.S. PATENT DOCUMENTS

| 8,532,714 B2* | 9/2013 | Sampat | H04W 8/245 |
| | | | 455/3.06 |
| 2004/0098531 A1* | 5/2004 | Hagg | H04L 12/40097 |
| | | | 710/315 |

(Continued)

OTHER PUBLICATIONS

Intellectual Property India, "Examination Report," issued in connection with Indian Patent Application No. 201741034135, dated Jun. 3, 2020, 5 pages.

*Primary Examiner* — Duc T Duong
(74) *Attorney, Agent, or Firm* — Hanley, Flight & Zimmerman, LLC

(57) ABSTRACT

Methods, apparatus, systems and articles of manufacture to improve Bluetooth low energy streaming connection efficiency are disclosed herein. An example method includes accessing a request received at a first device from a second device, the request requesting set up of an isochronous link between the first device and the second device, the request including a configuration identifier. Whether the configuration identifier identifies a configuration stored at the first device is determined. In response to determining that the configuration identifier identifies the configuration stored at the first device, the isochronous link using the stored configuration.

21 Claims, 18 Drawing Sheets

(51) Int. Cl.
*H04L 29/06* (2006.01)
*H04L 29/08* (2006.01)
*H04W 4/50* (2018.01)
*H04W 84/12* (2009.01)

(56) References Cited

U.S. PATENT DOCUMENTS

| | | | | |
|---|---|---|---|---|
| 2008/0268922 | A1* | 10/2008 | Tamura | G10L 19/22 |
| | | | | 455/575.2 |
| 2011/0131358 | A1* | 6/2011 | Ganesh | G01C 21/265 |
| | | | | 710/304 |
| 2016/0299739 | A1* | 10/2016 | Song | H04W 4/80 |
| 2016/0359925 | A1 | 12/2016 | Song | |
| 2017/0171798 | A1* | 6/2017 | Song | H04W 48/12 |
| 2017/0244576 | A1* | 8/2017 | Batra | H04W 56/00 |
| 2017/0332236 | A1* | 11/2017 | Li | G06F 21/32 |
| 2018/0049122 | A1* | 2/2018 | Di Marco | H04W 52/0216 |
| 2018/0098277 | A1* | 4/2018 | Brageul | H04W 52/028 |
| 2018/0159960 | A1* | 6/2018 | Farrugia | H04L 67/28 |
| 2019/0215673 | A1* | 7/2019 | Choi | H04W 12/08 |
| 2019/0215879 | A1* | 7/2019 | Song | H04W 4/80 |
| 2019/0349718 | A1* | 11/2019 | Kwon | H04W 76/15 |

* cited by examiner

METHODS AND APPARATUS TO IMPROVE BLUETOOTH LOW ENERGY STREAMING CONNECTION EFFICIENCY

RELATED APPLICATION

This patent hereby claims priority to Indian Patent Application Serial No. 201741034135, which was filed on Sep. 26, 2017, and was entitled "METHODS AND APPARATUS TO IMPROVE BLUETOOTH LOW ENERGY STREAMING CONNECTION EFFICIENCY." Indian Patent Application Serial No. 201741034135 is hereby incorporated herein by reference in its entirety.

FIELD OF THE DISCLOSURE

This disclosure relates generally to Bluetooth streaming, and, more particularly, to methods and apparatus to improve Bluetooth low energy streaming connection efficiency.

BACKGROUND

In recent years, wireless devices have been used to stream audio from one device to another. For example, a user might use a mobile device to stream audio to a pair of headphones. In some examples, the user may wish to stream audio from the mobile device to a first set of speakers as well as a separate set of speakers. Streaming to multiple different speaker devices enables the audio to be simultaneously played at multiple different locations.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Developments to Bluetooth communication technology are continually being made. Recently, Bluetooth low energy protocols have been introduced that enable streaming of audio from one source device to multiple sink devices in a substantially simultaneous manner. Such specifications utilize two approaches for streaming audio data. For example, low-energy unicast audio may be used to transmit data from one source device to one sink device. Alternatively, low-energy broadcast transmissions that utilize an isochronous connectionless channel (ICL) may be used. ICL is considered a less reliable auto delivery mechanism, because there is no logical bi-directional connection between each pair of devices. As a result, there is no acknowledgment mechanism. To ensure that communications are properly acknowledged, implementations of ICL communications send multiple copies of the audio data, resulting in an increased power consumption at the source device. While such increased power consumption may be acceptable in certain situations (e.g., when the source device is powered via a wall outlet), such an approach is undesirable in situations where the source device is battery-powered.

As noted above, the low-energy unicast audio protocols utilize a more reliable protocol with an acknowledgment scheme built-in, via isochronous connection oriented channels (ICO). ICO maintains a connection between the audio source device in each of the audio sink devices that consume an audio stream. To achieve communications from one source device to multiple sink devices, ICO duplicates the audio stream and sends the audio stream to each sink device.

Figure 1:
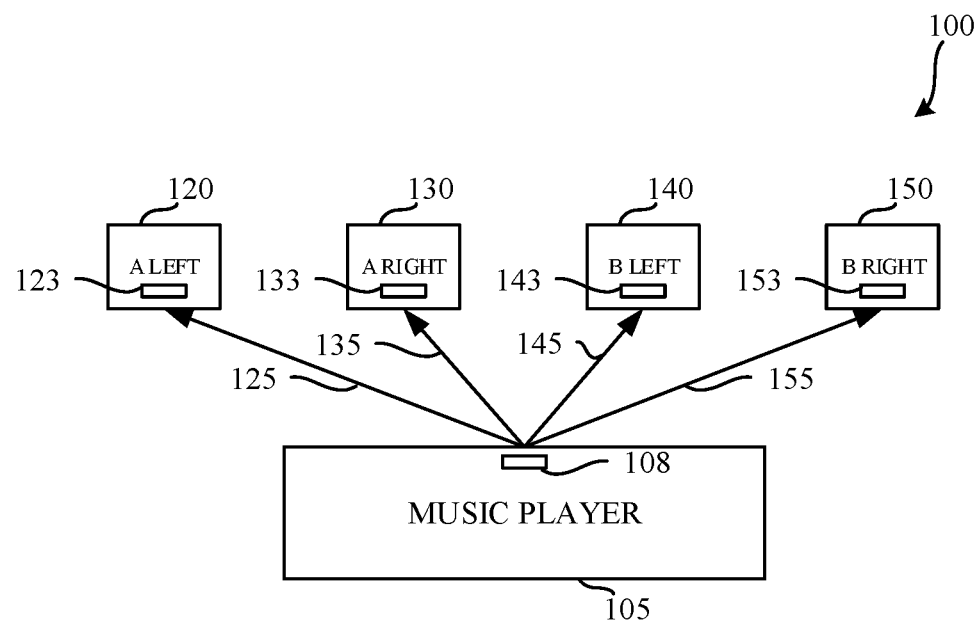
FIG. 1 is a diagram representing an example known approach to streaming audio from a source device to multiple sink devices.

FIG. 1 is a diagram representing an example known approach to streaming audio from a source device 105 to multiple sink devices 120, 130, 140, 150. In the illustrated example of FIG. 1, a transceiver 108 of the source device 105 communicates with transceivers 123, 133, 143, 153 of corresponding sink devices 120, 130, 140, 150 by establishing individual corresponding connections 125, 135, 145, 155 with each of the sink devices. In the illustrated example of FIG. 1, the example source device 105 is a music player. The example sink devices represent two separate sets of headphones having two channels per headphone (e.g., a left channel and a right channel). However, any other past, present, and/or future types of devices and/or arrangements thereof may additionally or alternatively be used. When communicating using the example connections 125, 135, 145, 155, the example source device 105 transmits the corresponding data four times, thereby consuming additional power and communication bandwidth.

Figure 2:
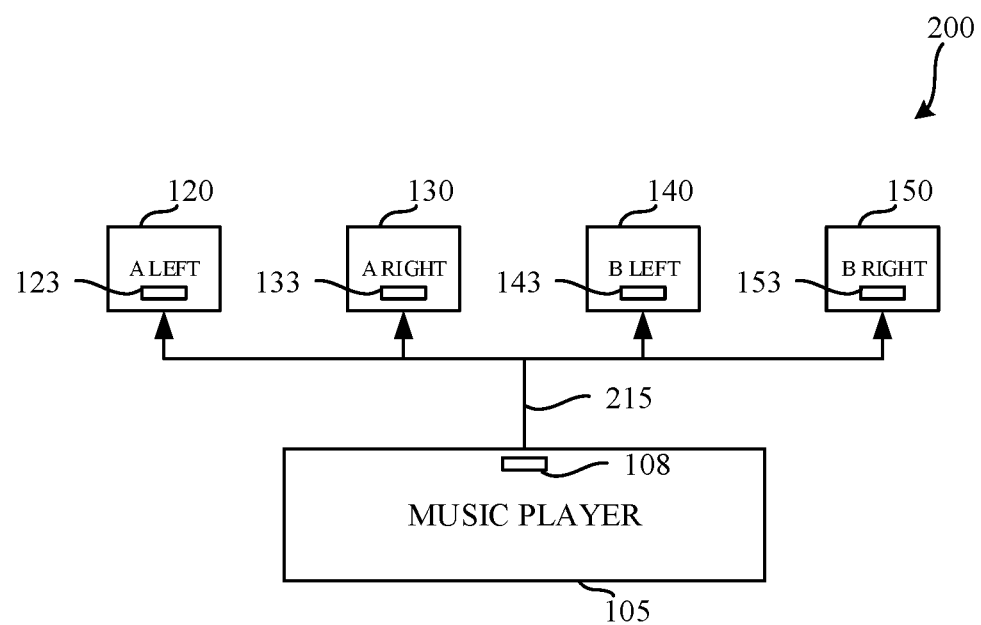
FIG. 2 is a diagram representing an example approach to streaming audio from a source device to multiple sink devices.

FIG. 2 is a diagram representing an example approach to streaming audio from a source device 105 to multiple sink devices 120, 130, 140, 150. In the illustrated example of FIG. 2, ICO communications are utilized with each of the sink devices 120, 130, 140, 150 such that a same ICO channel 215 is specified for all sink devices. Example approaches disclosed herein utilize an acknowledgment scheme where the source device 105 orchestrates acknowledgments from the sink devices 120, 130, 140, 150 of the data transmitted via the shared channel. Using such an approach decreases power consumption at the source device. The order of magnitude of the power reduction can reach 1/N, where N is the number of sink devices. For example, in a mono speech voice call with two earbuds (two devices), half of the power is consumed using example approaches disclosed herein, as compared to if such approaches were not used. In a stereo codec arrangement where audio is transmitted to four speakers (e.g., four devices), one fourth of the power is consumed using example approaches disclosed herein, as compared to if such approaches were not used.

Moreover, when transmitting data from a source device to a sink device, the amount of time required to establish and/or re-establish a connection is important. Some example approaches disclosed herein reduce an amount of time required to establish a connection by using a fixed configuration, which makes a zero-configuration solution possible. Some example approaches disclosed herein reduce an amount of time required to establish a connection by storing previously used connection configuration information, thereby reducing the need to re-discover capabilities when initiating a connection. In some examples, that stored connection configuration information can be used to more quickly re-establish a prior isochronous link.

Figure 3:
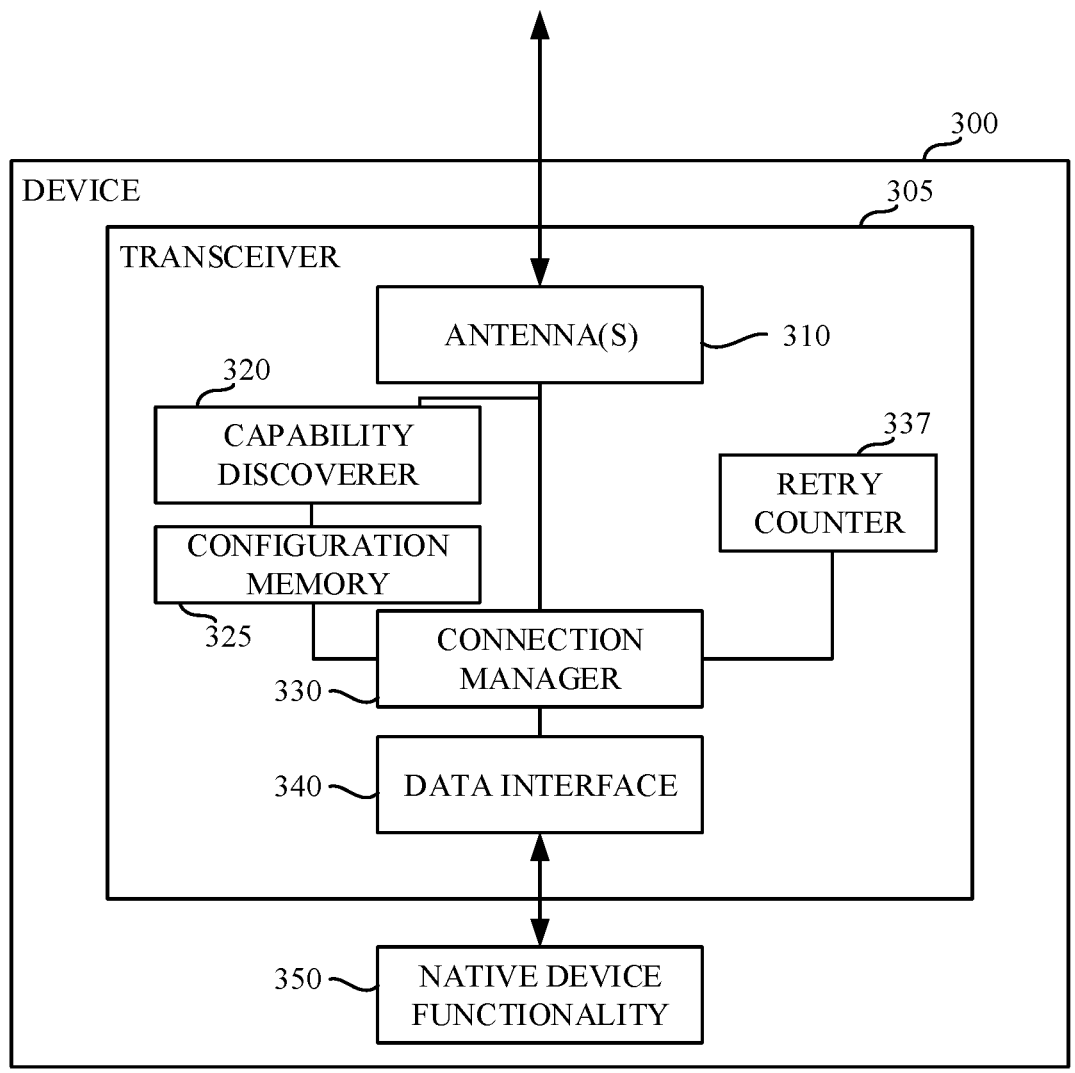
FIG. 3 is a block diagram representing an example implementation of the source device of FIG. 2.

FIG. 3 is a block diagram representing an example implementation of the device 300 of FIG. 2. The example device 300 includes a transceiver 305 and example native device functionality 350. The example transceiver 305 includes one or more antenna(s) 310, a capability discoverer 320, a configuration memory 325, a connection manager 330, a retry counter 337, and a data interface 340.

The example one or more antennas 310 of the illustrated example of FIG. 3 are antennas that enable the example capability discoverer 320 and/or the example connection manager 330 to communicate with an external transceiver (e.g., a transceiver implemented in an external device). In examples disclosed herein, the example capability discoverer 320 and the example connection manager 330 are directly connected to the one or more antennas 310. However, the example capability discoverer 320 and the example connection manager 330 may be connected to the one or more antennas 310 in any other fashion.

The example capability discoverer 320 of the illustrated example of FIG. 3 identifies desired capabilities that are to be identified in a discovery message transmitted to other devices. In examples disclosed herein, the desired capabilities are based on one or more requests, features, and/or functionality provided and/or received from the native device functionality 350. The example capability discoverer 320 transmits, via the antenna(s) 310, a discovery message with an identification of the requested capabilities.

The example capability discoverer 320 parses responses received in connection with the discovery message(s) to identify devices that reported capabilities that match the desired capabilities. In examples disclosed herein, the received responses are formatted using a length, tag, and value (LTV) format. Thus, multiple different capabilities can be reported via a single response message. However, any other response message format may additionally or alternatively be used. The example capability discoverer 320 stores corresponding identifiers of devices that reported their matching capabilities in the example configuration memory 325. The example connection manager 330 may then use the information stored in the example configuration memory 325 when requesting that those other devices apply and/or store a particular configuration.

The example configuration memory 325 of the illustrated example of FIG. 3 is implemented by a flash memory. However, any other type of memory device may additionally or alternatively be used. For example, the example configuration memory 325 may be implemented by a mass storage device and/or memory technology such as NAND flash memory, NOR flash memory, three dimensional cross-point (3D Cross-point) memory, ferroelectric memory, silicon-oxide-nitride-oxide-silicon (SONOS) memory, polymer memory such as ferroelectric polymer memory, ferroelectric transistor random access memory (FeTRAM or FeRAM), nanowire, phase change memory, phase change memory with switch, magnetoresistive random access memory (MRAM), spin transfer torque (STT) memory, a floppy disk, a hard drive, etc. In examples disclosed herein, the configuration memory 325 stores identifications of capabilities available at other devices discovered by the capability discoverer 320, information concerning configurations of connections established based on those configurations, information concerning fixed configurations, etc.

The example connection manager 330 controls the connections established to and/or from the device 300. Upon a determination that a connection using a desired capability is to be established (e.g., in response to an indication that data is to be transmitted), the example connection manager 330 reviews the configuration memory 325 to identify sink devices that had previously reported the desired capability. In response to identifying one or more sink device(s) that provides the desired capability, the example connection manager 330 transmits one or more configuration requests to those identified devices. If no sink devices were identified, the example connection manager 330 causes the capability discoverer 320 to reinitiate a discovery process based on the desired capability. Re-initiating the discovery process causes matching capabilities of nearby devices to be re-discovered and/or stored in the configuration memory 325. Once those capabilities are discovered, the example connection manager 330 can proceed to establish a connection.

In examples disclosed herein, the example connection manager 330 (e.g., when implemented in a sink device) receives a discovery request identifying capabilities desired by a source device. The example connection manager 330 identifies those capabilities that match the desired capabilities by interfacing with the example native device functionality 350 to determine features, functionalities, etc. that are provided by the native device functionality 350. The example connection manager 330 encodes the list of matching capabilities and provides the same in response to the discovery request. In examples disclosed herein, the matching capabilities are encoded in an LTV format. However, any other encoding format may additionally or alternatively be used. In examples disclosed herein, the connection manager 330 transmits the encoded list of matching capabilities to the requesting source device using a single message. However, in some examples, multiple messages may be used to transmit the complete list of encoded matching capabilities.

In some examples, a previously established connection between two devices may be lost. The example connection manager 330 determines an identifier of the configuration used in the lost connection by inspecting the configuration memory 325. The example connection manager 330 transmits a reset configuration message with an identifier of the configuration to be used for the renewed connection (e.g., an identifier of the configuration that was previously used for the connection). Having previously stored the configuration that is to be used, the example sink device may, instead of having to undergo the discovery and configuration phase(s), restore the configuration based on the provided configuration identifier.

The example retry counter 337 of the illustrated example of FIG. 3 is implemented by a flash memory. However, any other type of memory device may additionally or alternatively be used. For example, the example retry counter 337 may be implemented by a mass storage device and/or memory technology such as NAND flash memory, NOR flash memory, three dimensional cross-point (3D Crosspoint) memory, ferroelectric memory, silicon-oxide-nitride-oxide-silicon (SONOS) memory, polymer memory such as ferroelectric polymer memory, ferroelectric transistor random access memory (FeTRAM or FeRAM), nanowire, phase change memory, phase change memory with switch, magnetoresistive random access memory (MRAM), spin transfer torque (STT) memory, a floppy disk, a hard drive, etc. In examples disclosed herein, the retry counter 337 stores a number of retry attempts made when transmitting multicast data.

The example data interface 340 of the illustrated example of FIG. 3 is implemented by a serial interface that receives data from and/or provides data to the native device functionality 350. However, the example data interface 340 may be implemented by any other type of interface.

The example native device functionality 350 of the illustrated example of FIG. 3 implements intended operations of the example device 300. For example, the native device functionality 350 may implement an operating system, an app, a program, etc. In examples disclosed herein, while the native device functionality 350 is not directly involved in the transmission of streaming audio, the example native device functionality 350 benefits from the reduced bandwidth and/or power consumed when using multicast communications, as well as the reduction in resources and/or time associated with establishing connections with other devices.

Figure 4:
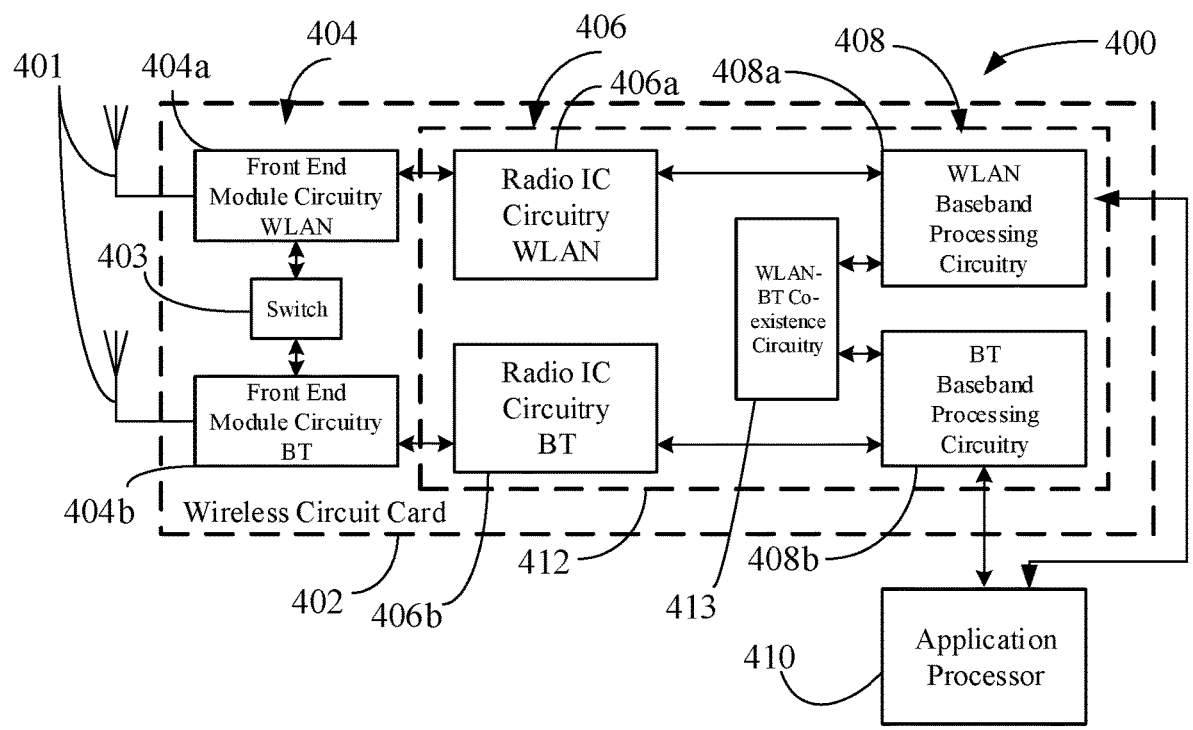
FIG. 4 is a block diagram of a radio architecture in accordance with some embodiments.

FIG. 4 is a block diagram of a radio architecture 400 in accordance with some embodiments. Radio architecture 400 may include radio front-end module (FEM) circuitry 404, radio IC circuitry 406 and baseband processing circuitry 408. Radio architecture 400 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 404 may include a WLAN or Wi-Fi FEM circuitry 404*a* and a Bluetooth (BT) FEM circuitry 404*b*. The WLAN FEM circuitry 404*a* may include a receive signal path comprising circuitry configured to operate on WLAN RF signals received from one or more antennas 401, to amplify the received signals and to provide the amplified versions of the received signals to the WLAN radio IC circuitry 406*a* for further processing. The BT FEM circuitry 404*b* may include a receive signal path which may include circuitry configured to operate on BT RF signals received from one or more antennas 401, to amplify the received signals and to provide the amplified versions of the received signals to the BT radio IC circuitry 406*b* for further processing. FEM circuitry 404*a* may also include a transmit signal path which may include circuitry configured to amplify WLAN signals provided by the radio IC circuitry 406*a* for wireless transmission by one or more of the antennas 401. In addition, FEM circuitry 404*b* may also include a transmit signal path which may include circuitry configured to amplify BT signals provided by the radio IC circuitry 406*b* for wireless transmission by the one or more antennas. In the embodiment of FIG. 4, although FEM 404*a* and FEM 404*b* are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 406 as shown may include WLAN radio IC circuitry 406*a* and BT radio IC circuitry 406*b*. The WLAN radio IC circuitry 406*a* may include a receive signal path which may include circuitry to down-convert WLAN RF signals received from the FEM circuitry 404*a* and provide baseband signals to WLAN baseband processing circuitry 408*a*. BT radio IC circuitry 406*b* may, in turn, include a receive signal path which may include circuitry to down-convert BT RF signals received from the FEM circuitry 404*b* and provide baseband signals to BT baseband processing circuitry 408*b*. WLAN radio IC circuitry 406*a* may also include a transmit signal path which may include circuitry to up-convert WLAN baseband signals provided by the WLAN baseband processing circuitry 408*a* and provide WLAN RF output signals to the FEM circuitry 404*a* for subsequent wireless transmission by the one or more antennas 401. BT radio IC circuitry 406*b* may also include a transmit signal path which may include circuitry to up-convert BT baseband signals provided by the BT baseband processing circuitry 408*b* and provide BT RF output signals to the FEM circuitry 404*b* for subsequent wireless transmission by the one or more antennas 401. In the embodiment of FIG. 4, although radio IC circuitries 406*a* and 406*b* are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 408 may include a WLAN baseband processing circuitry 408*a* and a BT baseband processing circuitry 408*b*. The WLAN baseband processing circuitry 408*a* may include a memory, such as, for example, a set of RAM arrays in a Fast Fourier Transform or Inverse Fast Fourier Transform block (not shown) of the WLAN baseband processing circuitry 408a. Each of the WLAN baseband circuitry 408a and the BT baseband circuitry 408b may further include one or more processors and control logic to process the signals received from the corresponding WLAN or BT receive signal path of the radio IC circuitry 406, and to also generate corresponding WLAN or BT baseband signals for the transmit signal path of the radio IC circuitry 406. Each of the baseband processing circuitries 408a and 408b may further include physical layer (PHY) and medium access control layer (MAC) circuitry, and may further interface with application processor 410 for generation and processing of the baseband signals and for controlling operations of the radio IC circuitry 406.

Referring still to FIG. 4, according to the shown embodiment, WLAN-BT coexistence circuitry 413 may include logic providing an interface between the WLAN baseband circuitry 408a and the BT baseband circuitry 408b to enable use cases requiring WLAN and BT coexistence. In addition, a switch 403 may be provided between the WLAN FEM circuitry 404a and the BT FEM circuitry 404b to allow switching between the WLAN and BT radios according to application needs. In addition, although the antennas 401 are depicted as being respectively connected to the WLAN FEM circuitry 404a and the BT FEM circuitry 404b, embodiments include within their scope the sharing of one or more antennas as between the WLAN and BT FEMs, or the provision of more than one antenna connected to each of FEM 404a or 404b.

In some examples, the Radio IC circuitry 406 may be implemented without the WLAN radio IC circuitry 406a, the WLAN Baseband circuitry 408a and/or the WLAN-BT coexistence circuitry 413. That is, in some examples, the Radio IC circuitry 406 may be implemented with the BT radio IC circuitry 406b and the BT Baseband circuitry 408b (e.g., a Bluetooth-only implementation).

In some embodiments, the front-end module circuitry 404, the radio IC circuitry 406, and baseband processing circuitry 408 may be provided on a single radio card, such as wireless radio card 402. In some other embodiments, the one or more antennas 401, the FEM circuitry 404 and the radio IC circuitry 406 may be provided on a single radio card. In some other embodiments, the radio IC circuitry 406 and the baseband processing circuitry 408 may be provided on a single chip or integrated circuit (IC), such as IC 412.

In some embodiments, the wireless radio card 402 may include a WLAN radio card and may be configured for Wi-Fi communications, although the scope of the embodiments is not limited in this respect. In some of these embodiments, the radio architecture 400 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 400 may be part of a Wi-Fi communication station (STA) such as a wireless access point (AP), a base station or a mobile device including a Wi-Fi device. In some of these embodiments, radio architecture 400 may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay, and/or 802.11ax standards and/or proposed specifications for WLANs, although the scope of embodiments is not limited in this respect. Radio architecture 400 may also be suitable to transmit and/or receive communications in accordance with other techniques and standards.

In some embodiments, the radio architecture 400 may be configured for high-efficiency Wi-Fi (HEW) communications in accordance with the IEEE 802.11ax standard. In these embodiments, the radio architecture 400 may be configured to communicate in accordance with an OFDMA technique, although the scope of the embodiments is not limited in this respect.

In some other embodiments, the radio architecture 400 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 4, the BT baseband circuitry 408b may be compliant with a Bluetooth (BT) connectivity standard such as Bluetooth, Bluetooth 2.0 or Bluetooth 3.0, or any other iteration of the Bluetooth Standard. In embodiments that include BT functionality as shown for example in FIG. 4, the radio architecture 400 may be configured to establish a BT synchronous connection oriented (SCO) link and or a BT low energy (BT LE) link. In some of the embodiments that include functionality, the radio architecture 400 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 4, the functions of a BT radio card and WLAN radio card may be combined on a single wireless radio card, such as single wireless radio card 402, although embodiments are not so limited, and include within their scope discrete WLAN and BT radio cards In some embodiments, the radio-architecture 400 may include other radio cards, such as a cellular radio card configured for cellular (e.g., 3GPP such as LTE, LTE-Advanced or 5G communications).

In some IEEE 802.11 embodiments, the radio architecture 400 may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 7 MHz, 8 MHz, 10 MHz, 40 MHz, 46 MHz, 50 MHz, 70 MHz, 80 MHz (with contiguous bandwidths) or 80+80 MHz (160 MHz) (with non-contiguous bandwidths). In some embodiments, a 620 MHz channel bandwidth may be used. The scope of the embodiments is not limited with respect to the above center frequencies however.

Figure 5:
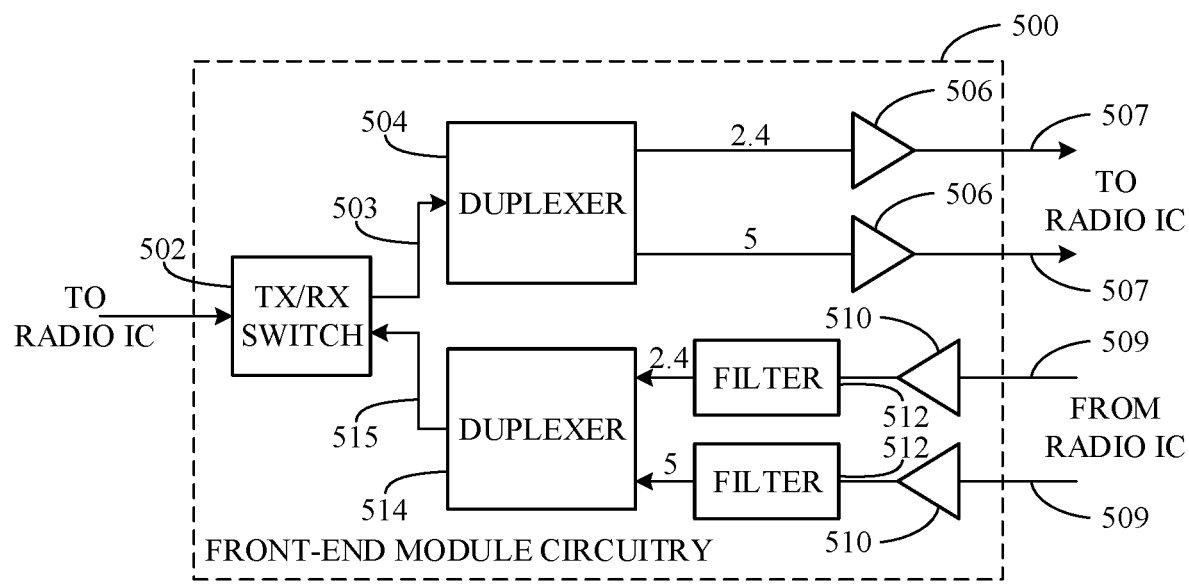
FIG. 5 illustrates a front-end module circuitry for use in the radio architecture of FIG. 4 in accordance with some embodiments.

FIG. 5 illustrates FEM circuitry 500 in accordance with some embodiments. The FEM circuitry 500 is one example of circuitry that may be suitable for use as the WLAN and/or BT FEM circuitry 404a/404b (FIG. 4), although other circuitry configurations may also be suitable.

In some embodiments, the FEM circuitry 500 may include a TX/RX switch 502 to switch between transmit mode and receive mode operation. The FEM circuitry 500 may include a receive signal path and a transmit signal path. The receive signal path of the FEM circuitry 500 may include a low-noise amplifier (LNA) 506 to amplify received RF signals 503 and provide the amplified received RF signals 507 as an output (e.g., to the radio IC circuitry 406 (FIG. 4)). The transmit signal path of the circuitry 500 may include a power amplifier (PA) to amplify input RF signals 509 (e.g., provided by the radio IC circuitry 406), and one or more filters 512, such as band-pass filters (BPFs), low-pass filters (LPFs) or other types of filters, to generate RF signals 515 for subsequent transmission (e.g., by one or more of the antennas 401 (FIG. 4)).

In some dual-mode embodiments for Wi-Fi communication, the FEM circuitry 500 may be configured to operate in either the 2.4 GHz frequency spectrum or the 5 GHz frequency spectrum. In these embodiments, the receive signal path of the FEM circuitry 500 may include a receive signal path duplexer 504 to separate the signals from each spectrum as well as provide a separate LNA 506 for each spectrum as shown. In these embodiments, the transmit signal path of the FEM circuitry 500 may also include a power amplifier 510 and a filter 512, such as a BPF, a LPF or another type of filter for each frequency spectrum and a transmit signal path duplexer 514 to provide the signals of one of the different spectrums onto a single transmit path for subsequent transmission by the one or more of the antennas 401 (FIG. 4). In some embodiments, BT communications may utilize the 2.4 GHZ signal paths and may utilize the same FEM circuitry 500 as the one used for WLAN communications.

Figure 6:
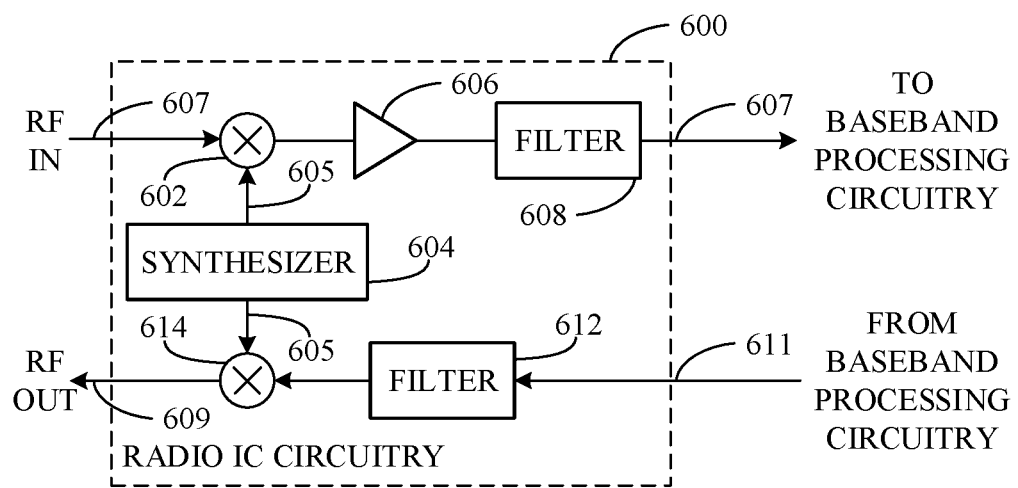
FIG. 6 illustrates a radio IC circuitry for use in the radio architecture of FIG. 4 in accordance with some embodiments.

FIG. 6 illustrates radio IC circuitry 600 in accordance with some embodiments. The radio IC circuitry 600 is one example of circuitry that may be suitable for use as the WLAN or BT radio IC circuitry 406a/406b (FIG. 4), although other circuitry configurations may also be suitable.

In some embodiments, the radio IC circuitry 600 may include a receive signal path and a transmit signal path. The receive signal path of the radio IC circuitry 600 may include at least mixer circuitry 602, such as, for example, down-conversion mixer circuitry, amplifier circuitry 606 and filter circuitry 608. The transmit signal path of the radio IC circuitry 600 may include at least filter circuitry 612 and mixer circuitry 614, such as, for example, up-conversion mixer circuitry. Radio IC circuitry 600 may also include synthesizer circuitry 604 for synthesizing a frequency 605 for use by the mixer circuitry 602 and the mixer circuitry 614. The mixer circuitry 602 and/or 614 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 6 illustrates only a simplified version of a radio IC circuitry, and may include, although not shown, embodiments where each of the depicted circuitries may include more than one component. For instance, mixer circuitry 620 and/or 614 may each include one or more mixers, and filter circuitries 608 and/or 612 may each include one or more filters, such as one or more BPFs and/or LPFs according to application needs. For example, when mixer circuitries are of the direct-conversion type, they may each include two or more mixers.

In some embodiments, mixer circuitry 602 may be configured to down-convert RF signals 507 received from the FEM circuitry 404 (FIG. 4) based on the synthesized frequency 605 provided by synthesizer circuitry 604. The amplifier circuitry 606 may be configured to amplify the down-converted signals and the filter circuitry 608 may include a LPF configured to remove unwanted signals from the down-converted signals to generate output baseband signals 607. Output baseband signals 607 may be provided to the baseband processing circuitry 408 (FIG. 4) for further processing. In some embodiments, the output baseband signals 607 may be zero-frequency baseband signals, although this is not a requirement. In some embodiments, mixer circuitry 602 may comprise passive mixers, although the scope of the embodiments is not limited in this respect.

In some embodiments, the mixer circuitry 614 may be configured to up-convert input baseband signals 611 based on the synthesized frequency 605 provided by the synthesizer circuitry 604 to generate RF output signals 509 for the FEM circuitry 404. The baseband signals 611 may be provided by the baseband processing circuitry 408 and may be filtered by filter circuitry 612. The filter circuitry 612 may include a LPF or a BPF, although the scope of the embodiments is not limited in this respect.

In some embodiments, the mixer circuitry 602 and the mixer circuitry 614 may each include two or more mixers and may be arranged for quadrature down-conversion and/or up-conversion respectively with the help of synthesizer 604. In some embodiments, the mixer circuitry 602 and the mixer circuitry 614 may each include two or more mixers each configured for image rejection (e.g., Hartley image rejection). In some embodiments, the mixer circuitry 602 and the mixer circuitry 614 may be arranged for direct down-conversion and/or direct up-conversion, respectively. In some embodiments, the mixer circuitry 602 and the mixer circuitry 614 may be configured for super-heterodyne operation, although this is not a requirement.

Mixer circuitry 602 may comprise, according to one embodiment: quadrature passive mixers (e.g., for the in-phase (I) and quadrature phase (Q) paths). In such an embodiment, RF input signal 507 from FIG. 6 may be down-converted to provide I and Q baseband output signals to be sent to the baseband processor Quadrature passive mixers may be driven by zero and ninety degree time-varying LO switching signals provided by a quadrature circuitry which may be configured to receive a LO frequency (fLO) from a local oscillator or a synthesizer, such as LO frequency 605 of synthesizer 604 (FIG. 6). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 55% duty cycle and a 50% offset. In some embodiments, each branch of the mixer circuitry (e.g., the in-phase (I) and quadrature phase (Q) path) may operate at a 55% duty cycle, which may result in a significant reduction is power consumption.

The RF input signal 507 (FIG. 5) may comprise a balanced signal, although the scope of the embodiments is not limited in this respect. The I and Q baseband output signals may be provided to low-nose amplifier, such as amplifier circuitry 606 (FIG. 6) or to filter circuitry 608 (FIG. 6).

In some embodiments, the output baseband signals 607 and the input baseband signals 611 may be analog baseband signals, although the scope of the embodiments is not limited in this respect. In some alternate embodiments, the output baseband signals 607 and the input baseband signals 611 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 604 may be a fractional-N synthesizer or a fractional N/N+1 synthesizer, although the scope of the embodiments is not limited in this respect as other types of frequency synthesizers may be suitable. For example, synthesizer circuitry 604 may be a delta-sigma synthesizer, a frequency multiplier, or a synthesizer comprising a phase-locked loop with a frequency divider. According to some embodiments, the synthesizer circuitry 604 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 604 may be provided by a voltage controlled oscillator (VCO), although that is not a requirement. A divider control input may further be provided by either the baseband processing circuitry 408 (FIG. 4) or the application processor 410 (FIG. 4) depending on the desired output frequency 605. In some embodiments, a divider control input (e.g., N) may be determined from a look-up table (e.g., within a Wi-Fi card) based on a channel number and a channel center frequency as determined or indicated by the application processor 410.

In some embodiments, synthesizer circuitry 604 may be configured to generate a carrier frequency as the output frequency 605, while in other embodiments, the output frequency 605 may be a fraction of the carrier frequency (e.g., one-half the carrier frequency, one-third the carrier frequency). In some embodiments, the output frequency 605 may be a LO frequency (fLO).

Figure 7:
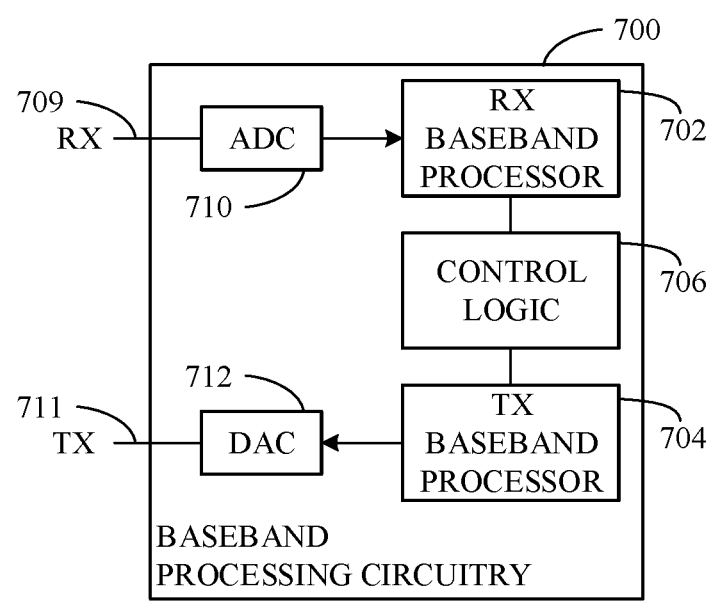
FIG. 7 illustrates a baseband processing circuitry for use in the radio architecture of FIG. 4 in accordance with some embodiments.

FIG. 7 illustrates a functional block diagram of baseband processing circuitry 700 in accordance with some embodiments. The baseband processing circuitry 700 is one example of circuitry that may be suitable for use as the baseband processing circuitry 408 (FIG. 4), although other circuitry configurations may also be suitable. The baseband processing circuitry 700 may include a receive baseband processor (RX BBP) 702 for processing receive baseband signals 609 provided by the radio IC circuitry 406 (FIG. 4) and a transmit baseband processor (TX BBP) 704 for generating transmit baseband signals 611 for the radio IC circuitry 406. The baseband processing circuitry 700 may also include control logic 706 for coordinating the operations of the baseband processing circuitry 700.

In some embodiments (e.g., when analog baseband signals are exchanged between the baseband processing circuitry 700 and the radio IC circuitry 406), the baseband processing circuitry 700 may include ADC 710 to convert analog baseband signals 709 received from the radio IC circuitry 406 to digital baseband signals for processing by the RX BBP 702. In these embodiments, the baseband processing circuitry 700 may also include DAC 712 to convert digital baseband signals from the TX BBP 704 to analog baseband signals 711.

In some embodiments that communicate OFDM signals or OFDMA signals, such as through baseband processor 408a, the transmit baseband processor 704 may be configured to generate OFDM or OFDMA signals as appropriate for transmission by performing an inverse fast Fourier transform (IFFT). The receive baseband processor 702 may be configured to process received OFDM signals or OFDMA signals by performing an FFT. In some embodiments, the receive baseband processor 702 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 4, in some embodiments, the antennas 401 (FIG. 4) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 401 may each include a set of phased-array antennas, although embodiments are not so limited.

Although the radio-architecture 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

While an example manner of implementing the example device 300 of FIG. 3 is illustrated in FIGS. 3, 4, 5, 6, and/or 7, one or more of the elements, processes and/or devices illustrated in FIGS. 3, 4, 5, 6, and/or 7 may be combined, divided, re-arranged, omitted, eliminated and/or implemented in any other way. Further, the example capability discoverer 320, the example configuration memory 325, the example connection manager 330, the example retry counter 337, the example data interface 340, and/or, more generally, the device 300 of FIG. 3 may be implemented by hardware, software, firmware and/or any combination of hardware, software and/or firmware. Thus, for example, any of the example capability discoverer 320, the example configuration memory 325, the example connection manager 330, the example retry counter 337, the example data interface 340, and/or, more generally, the device 300 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example capability discoverer 320, the example configuration memory 325, the example connection manager 330, the example retry counter 337, the example data interface 340, and/or, more generally, the device 300 of FIG. 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example device 300 of FIG. 3 may include one or more elements, processes and/or devices in addition to, or instead of, those illustrated in FIG. 4, and/or may include more than one of any or all of the illustrated elements, processes and devices.

Flowchart(s) representative of example machine readable instructions for implementing the example device 300 of FIG. 3 is/are shown in FIGS. 8, 13, 14, 15, 16, 17, and/or 18. In these examples, the machine readable instructions comprise a program(s) for execution by a processor such as the processor 1912 shown in the example processor platform 1900 discussed below in connection with FIG. 19. The program may be embodied in software stored on a non-transitory computer readable storage medium such as a CD-ROM, a floppy disk, a hard drive, a digital versatile disk (DVD), a Blu-ray disk, or a memory associated with the processor 1912, but the entire program and/or parts thereof could alternatively be executed by a device other than the processor 1912 and/or embodied in firmware or dedicated hardware. Further, although the example program is described with reference to the flowchart(s) illustrated in FIGS. 8, 13, 14, 15, 16, 17, and/or 18, many other methods of implementing the example device 300 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 8, 13, 14, 15, 16, 17, and/or 18 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Figure 8:
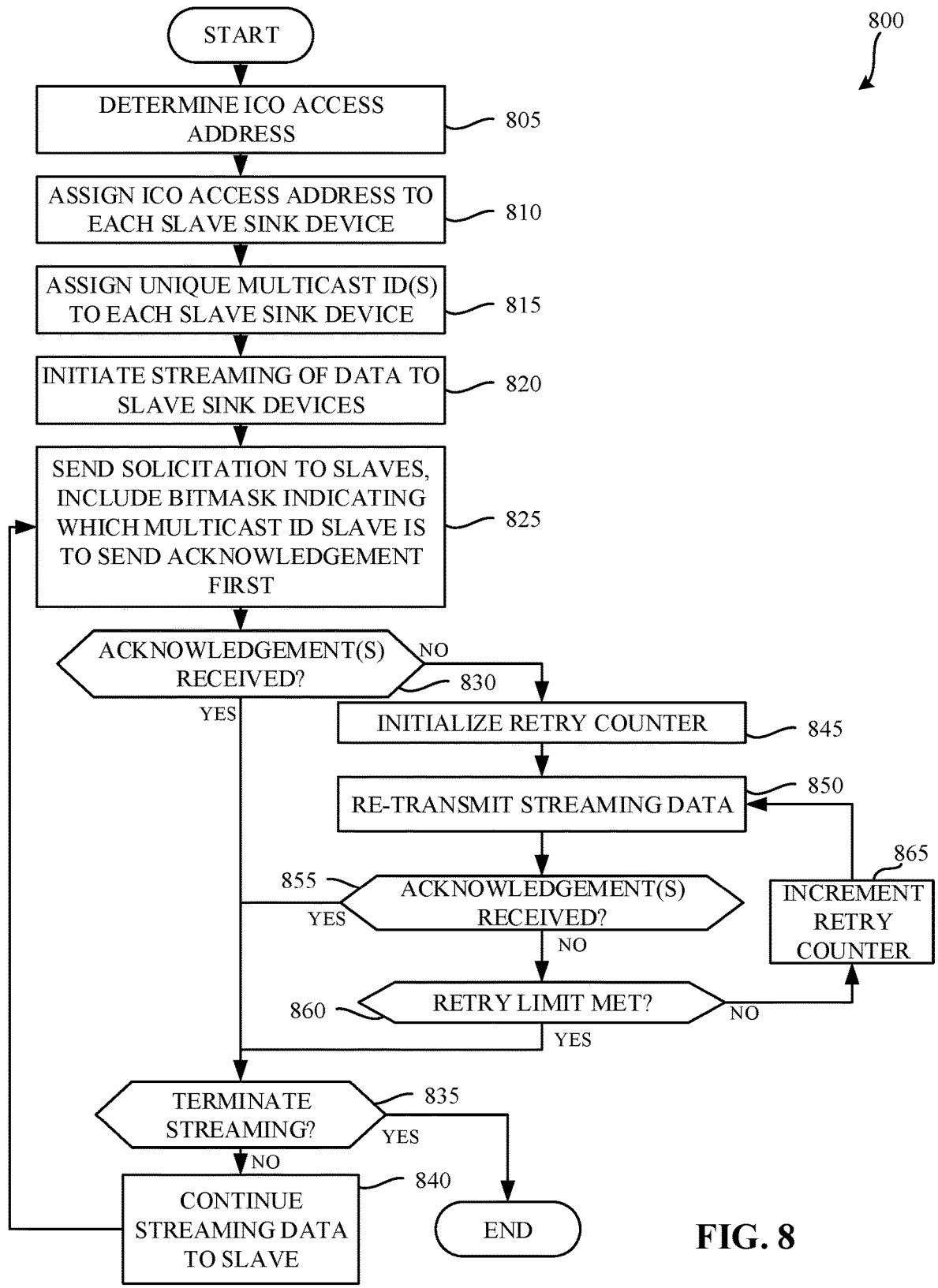
FIG. 8 is a flowchart representative of example machine-readable instructions which, when executed, cause the example device of FIG. 3 to transmit multicast data to one or more sink device(s).

FIG. 8 is a flowchart representative of example machine-readable instructions which, when executed, cause the example device of FIG. 3 to transmit multicast data to one or more sink device(s). The example process 800 of the illustrated example of FIG. 8 begins when the example connection manager 330 determines an Isochronous Connection Oriented (ICO) access address that is to be used to identify the multicast stream. (Block 805). The example connection manager 330 assigns the ICO access address to each slave sink device that will be part of the multicast stream. (Block 810). The example connection manager 330 then assigns unique multicast identifiers to each slave sink device that will be part of the multicast stream. (Block 815). For example, a first sink device receives a unique multicast identifier of one, a second sink device receives a unique multicast identifier of two, etc. In examples disclosed herein, the unique multicast identifiers are four-bit values. However, any other format and/or type of values may additionally or alternatively be used.

The example connection manager 330 of a master device initiates streaming of incoming data (e.g., data received via the data interface 340) to the slave devices. (Block 820). As part of the data streaming, the example connection manager 330 transmits a solicitation to those slave devices requesting acknowledgment of the streaming data. The solicitation message includes a bit mask indicating which slave device is to send an acknowledgment first. (Block 825). For example, the example connection manager 330 may transmit a solicitation message that identifies the first slave device (e.g., the slave device identified using the multicast identifier one is to be the first slave device to transmit its acknowledgment message). Subsequently identified slave devices then sequentially transmit their acknowledgments. The sequential transmission of the acknowledgments is performed in a time-division multiplexed (TDM) fashion.

The example connection manager 330 determines whether all of the expected acknowledgments have been received. (Block 830). In examples disclosed herein, an acknowledgment is received when an ACK message is received from the slave sink devices. In contrast, the acknowledgment is not received when either no message is returned or the slave sink device affirmatively returns a negative acknowledgement (NAK) message. If all acknowledgments have been received, (e.g., block 830 returns a result of YES), the example connection manager 330 determines whether streaming should be terminated. (Block 835). The example connection manager 330 determines whether streaming should be terminated by determining whether there is additional data for transmission via the data interface 340. However, the example connection manager 330 may determine whether to terminate streaming in any other fashion such as, for example, determining whether a termination instruction has been received from the native device functionality 350. If the example connection manager 330 determines that streaming is not to be terminated (e.g., block 835 returns a result of NO), the example connection manager 330 continues streaming data to the slaves. (Block 840). Control proceeds to block 825 where subsequent streaming and solicitation messages are transmitted.

Returning to block 830, if one or more of the expected acknowledgments are not received (e.g., block 830 returns a result of NO), the example connection manager 330 initializes the retry counter 337. (Block 845). In examples disclosed herein the retry counter is set to zero and, as described below, are incremented until a retry limit has been met. In examples disclosed herein, a single retry counter is used. However, in some examples, multiple retry counter(s) may be used that correspond to respective ones of the multicast sink devices. However, any other approach to limiting an amount of retries may additionally or alternatively be used. The example connection manager 330 retransmits the streaming data to the slave devices. (Block 850). The example retransmission of the streaming data identifies which slave devices are to acknowledge the retransmission (e.g., identifies those slave devices that resulted in block 830 returning a result of NO). The example connection manager 330 determines whether the expected acknowledgments in response to the retransmission of the streaming data are received from the slave devices. (Block 855). If all acknowledgments are received (e.g., block 855 returns a result of YES), control proceeds to block 835, where the example connection manager 330 determines whether to terminate streaming. (Block 835).

Returning to block 855, if one or more of the expected acknowledgments are not received, the example connection manager determines whether the number of retries stored in the retry counter meets a retry limit. (Block 860). If the retry limit has been met, no further retransmissions of the streaming data are attempted, and control proceeds to block 835. In examples disclosed herein, the retry limit is three retry attempts. However, any other retry limit may additionally or alternatively be used. If the retry limit has not been met (e.g., block 860 returns a result of NO), the example connection manager 330 increments the retry count. Blocks 850 through 865 are then repeated until either the expected acknowledgments are received (e.g., block 855 returns result of YES), or until the number of retries meets the retry limit (e.g., block 860 returns a result of YES).

Figure 9:
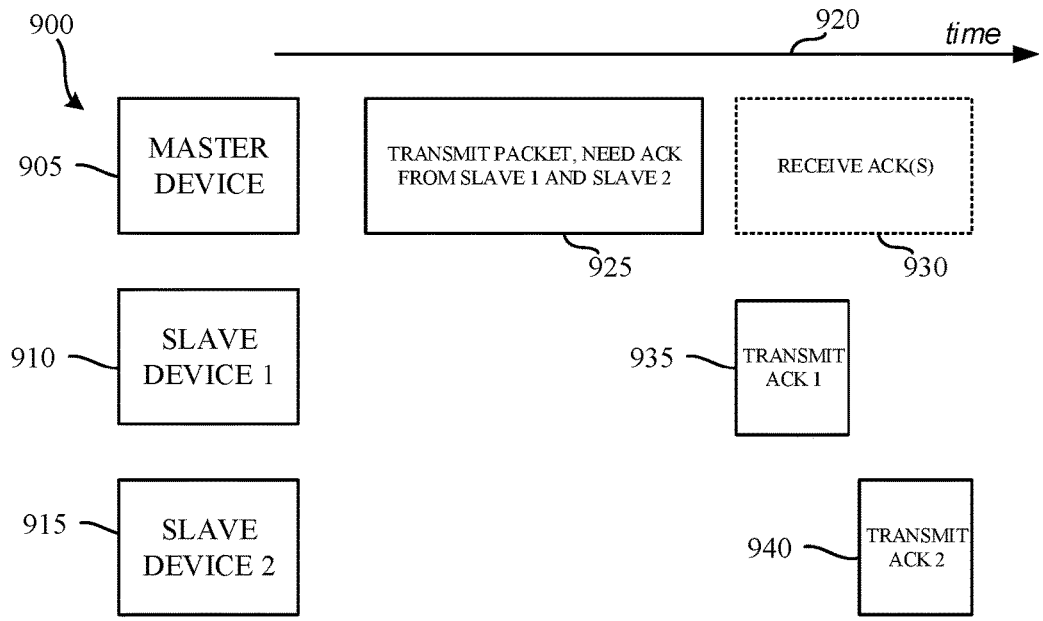
FIG. 9 is a timing diagram representing example communications that may be transmitted in connection with execution of the example instructions of FIG. 8.

FIG. 9 is a timing diagram 900 representing example communications that may be transmitted in connection with the execution of the example instructions of FIG. 8. The example timing diagram 900 of the illustrated example of FIG. 9 represents communications from a master device 905 to a first slave device 910 and a second slave device 915. The example communication diagram includes a horizontal axis 920 that represents time. The example communications represented by the communications diagram 900 begin when the example master device 905 transmits a data packet and indicates that acknowledgments are needed from the first slave device 910 and the second slave device 915. (Block 925). The example master device 905 awaits acknowledgments from the slave devices 910, 915. (Block 930). In examples disclosed herein, the example master device 905 waits for a threshold amount of time for the slave devices 910, 915 to transmit their acknowledgments. In the illustrated example of FIG. 9, the first slave device 910 transmits a corresponding acknowledgment. (Block 935). The second example slave device 915 transmits its corresponding acknowledgment. (Block 940). Because both slave devices have acknowledged the transmitted data, no retransmission occurs.

Figure 10:
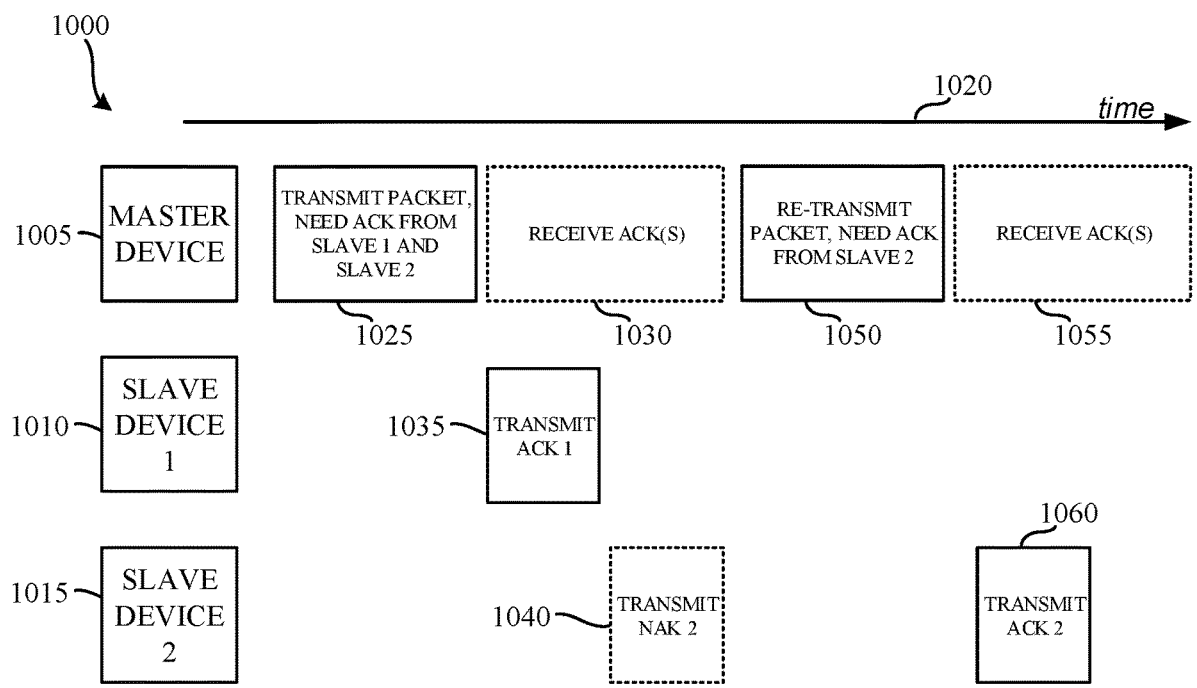
FIG. 10 is a timing diagram representing example alternative communications that may be transmitted in connection with execution of the example instructions of FIG. 8.

FIG. 10 is a timing diagram 1000 representing example alternative communications that may be transmitted in connection with the execution of the example instructions of FIG. 8. The example timing diagram 1000 of the illustrated example of FIG. 10 represents communications from a master device 1005 to a first slave device 1010 and a second slave device 1015. The example communication diagram includes a horizontal axis 1020 that represents time. The example communications represented by the timing diagram 1000 begin when the example master device 1005 transmits a data packet and indicates that acknowledgments are needed from the first slave device 1010 and the second slave device 1015. (Block 1025). The example master device 1005 then awaits acknowledgments from the slave devices 1010, 1015. (Block 1030).

In the illustrated example of FIG. 10, the first slave device 1010 transmits a corresponding acknowledgment. (Block 1035). However, the second slave device 1015 transmits a no acknowledgment message (NAK). (Block 1040). In response to the no acknowledgment message of block 1040, the example master device 1005 retransmits the data packet, and indicates that an acknowledgment is needed from the second slave device 1015. (Block 1050). The example master device 1005 then awaits an acknowledgment message from the second slave device 1015. (Block 1055). In the illustrated example of FIG. 10, the second slave device 1015 transmits the requested acknowledgment. (Block 1060). As noted above in connection with FIG. 8, the retransmission may be attempted until the second slave device 1015 responds with an affirmative acknowledgment message (e.g., the acknowledgment message of block 1060).

Figure 11:
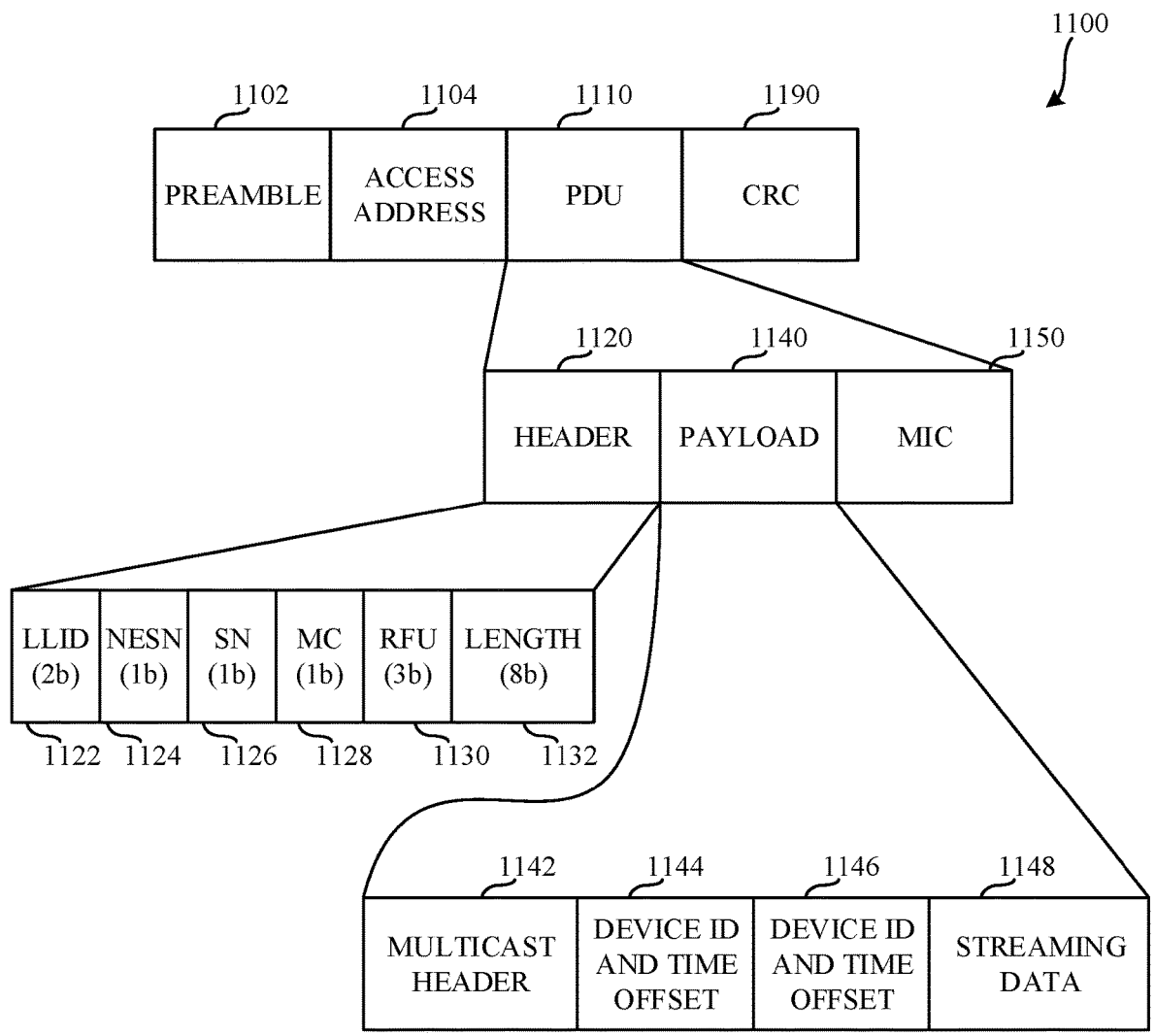
FIG. 11 is an example message structure that may be utilized when communicating data in accordance with the example instructions of FIG. 8.

FIG. 11 is an example message structure 1100 that may be utilized when communicating data in accordance with the example instructions of FIG. 8. The example message structure 1100 includes a preamble section 1102, an access address section 1104, a protocol data unit (PDU) 1110 section, and a cyclical redundancy check (CRC) section 1190. The example PDU section 1110 includes a header section 1120, a payload section 1140, and a message integrity check MIC section 1150. The example header section 1120 includes a LLID section 1122, a NESN section 1124, an SN section 1126, a multicast (MC) section 1128, a reserved for future use (RFU) section 1130, and a length section 1132. The example payload section 1140 includes a multicast header section 1142, a first device ID and time offset section 1144, a second device ID and time offset section 1146, and a streaming data section 1148.

The example MC section 1128 of the illustrated example of FIG. 11 includes one bit that represents whether an auxiliary multicast header (e.g., the multicast header section 1142) is included in the payload section 1140. The multicast header section 1142 includes a bit mask indicating which sink devices are to provide acknowledgments. The example first device ID and time offset section 1144 identifies the first sink device that is to provide their acknowledgment, and a time offset representing an amount of time that the sink device is to wait before sending the acknowledgment after the end of the transmission of the message. In the illustrated example of FIG. 11, the second device ID and time offset section 1146 identifies the second sink device that is to provide their acknowledgment, and a second time offset representing an amount of time that the second slave device is to wait before sending their corresponding acknowledgment. In some examples, the number of sub-device ID and time offset sections is dependent upon the number of sink devices participating in the multicast communications.

In existing Bluetooth specifications, each peer involved in an audio stream negotiates their capabilities every time those peers are connected. Not only this is a lengthy process which may include many rounds of capabilities exchange, it most likely ends up applying a mandatory configuration (e.g., a capability defining minimum functionalities defined in such Bluetooth specifications). If, for example, the mandatory (e.g., minimal) configuration is to be applied, applying such a configuration instead of undergoing a lengthy negotiation reduces the overall amount of processing and bandwidth resources expended on such negotiations. Moreover, when considered in the context of multicast communications, where multiple different devices are involved in such negotiations, reducing the amount of resources expended on establishing connections is even more beneficial.

Figure 12:
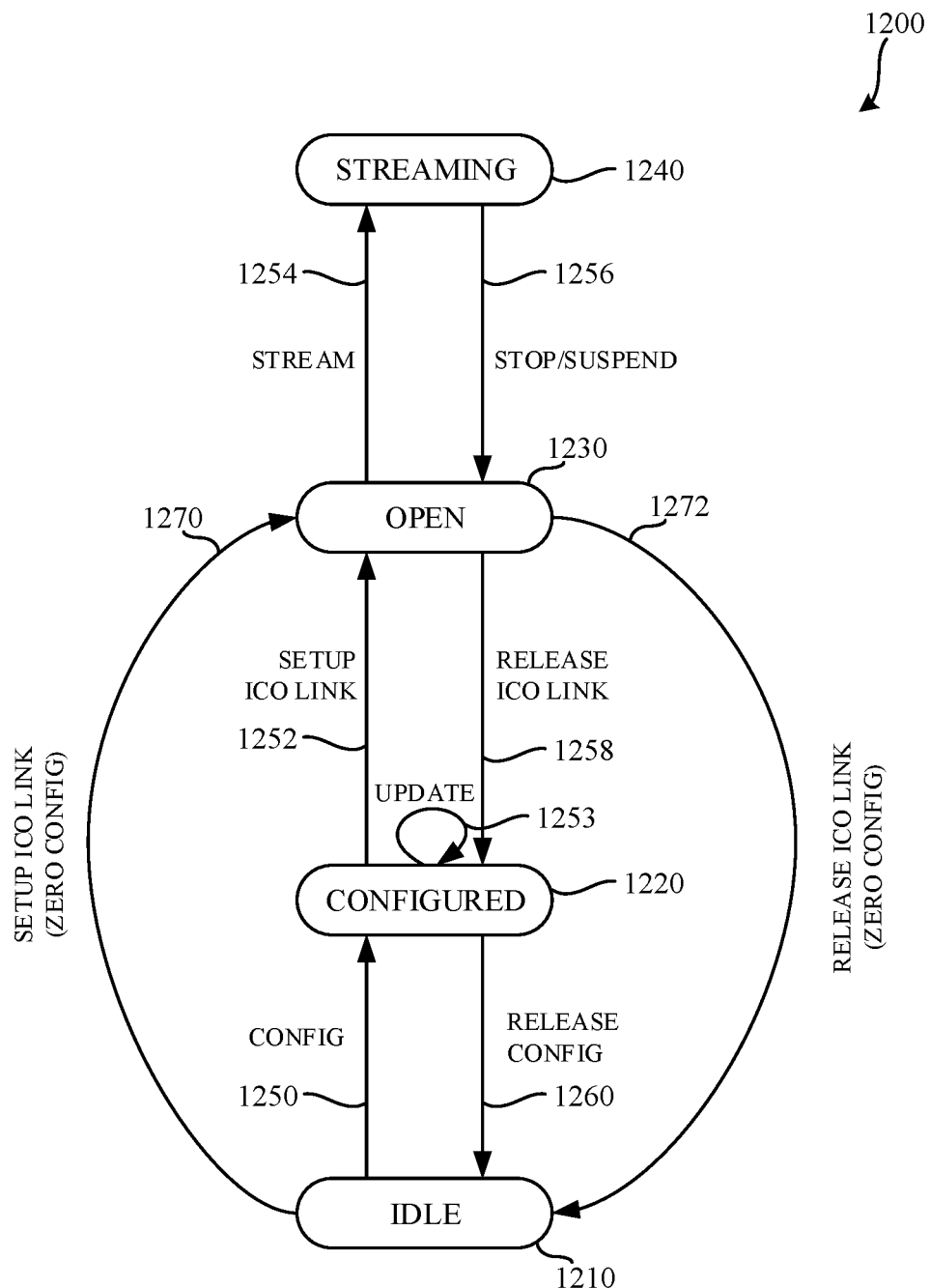
FIG. 12 is a state diagram representing example states and transitions there between that may be used when establishing a connection for streaming data.

FIG. 12 is a state diagram 1200 representing example state transitions that may be used when establishing a connection for streaming data. In the illustrated example of FIG. 12, audio streaming using a fixed configuration is used to facilitate the possibility of a zero-configuration system. Such an approach enables a bypass of capability discovery operations as well as stream configuration operations. Using such an approach also reduces the amount of resources used when establishing connections in a multicast scenario, as the same configuration settings should be available to all peers.

The example state machine 1200 of FIG. 12 includes an idle state 1210, a configured state 1220, an open state 1230, and a streaming state 1240. Traditionally, a connection moves from the idle state 1210 to the configured state 1220 by applying a configuration (Edge 1250), which includes discovery and negotiation of capabilities available between the peers to be connected. The connection moves from the configured state 1220 to the open state 1230 when an ICO link is set up between the peers. (Edge 1252). In some examples, configurations may be updated while in the configured state 1220. (Edge 1253). The connection moves from the open state 1230 to the streaming state 1240 when data is streamed over the ICO link. (Edge 1254) The connection moves from the streaming state 1240 back to the open state 1230 when the streaming of the data over the ICO link is stopped and/or suspended. (Edge 1256). The connection moves from the open state 1230 to the configured state 1220 when ICO link is released. (Edge 1258). The connection moves from the configured state 1220 to the idle state 1210 when the configuration(s) between the peers are released. (Edge 1260).

In the illustrated example of FIG. 12, capabilities are shown for re-opening an ICO stream with zero configuration, based on a fixed configuration (e.g., a pre-set configuration that is stored in the example configuration memory 325). Edge 1270 illustrates a transition from the idle state 1210 to the open state 1230, thereby bypassing the configured state 1220. Similarly, edge 1272 illustrates a transition from the open state 1230 to the idle state 1210, while bypassing the configured state 1220. Edge 1272 is also followed when the attempted configuration of the ICO link using edge 1270 fails. That is, the connection moves back to the idle state 1210, where the traditional configuration-based state path (e.g., the path via the configured state 1220) may be taken to establish the connection. Such an example path may be followed, for example, when a device fails to identify a stored zero config configuration, when a configuration change is made by a user to force one of the devices to use a non-fixed configuration, when the device lacks persistent storage for storing fixed configurations, etc.

As noted above, existing Bluetooth protocols are rather inefficient when attempting to establish connections between devices. For example, such initialization communications may involve several round trips of requests and/or responses which can cause interruptions and/or delays in establishing a connection. For example, existing approaches require that a first device discover a second nearby device, request a list of capabilities from that second nearby device, and then request that the second device set a configuration to establish the connection between the first device and the second device. Example approaches disclosed herein condense the discovery and configuration request messages for enhanced performance.

Figure 13:
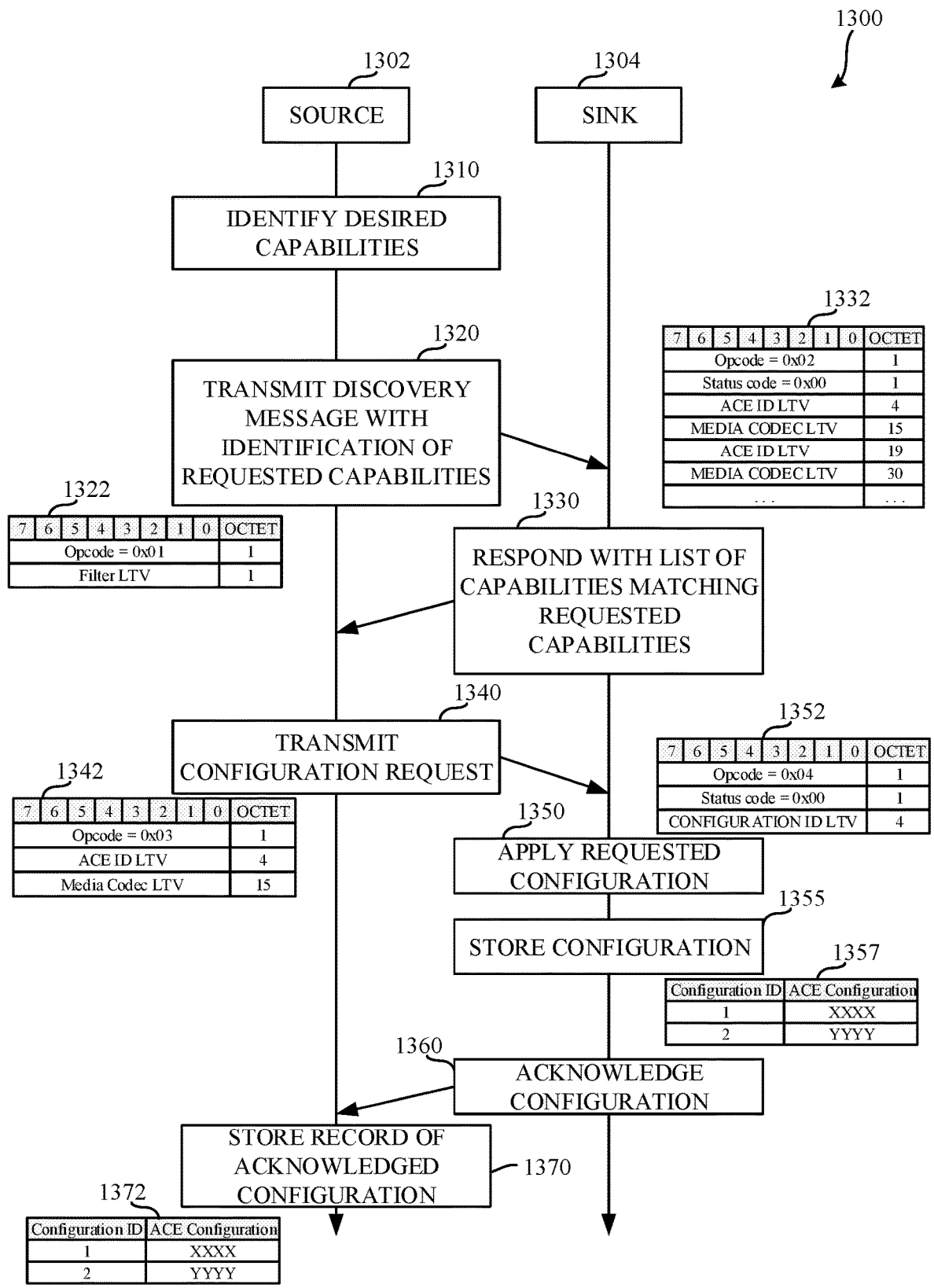
FIG. 13 is a communication diagram representing example communications between an example source device and an example sink device to establish a connection.

FIG. 13 is a communication diagram representing example communications between an example source transceiver and an example sink transceiver to establish a connection. The example communication diagram 1300 of the illustrated example of FIG. 13 represents operations and communications between a source device 1302 and a sink device 1304. Each of the example source device 1302 and the example sink device 1304 of FIG. 13 may be implemented by the example device 300 of FIG. 3. The example communication diagram 1300 begins when the example source device 1302 identifies desired capabilities of a potential sink device. (Block 1310). The example source device 1302 transmits a discovery message with an identification of requested capabilities of nearby sink devices. (Block 1320). An example message structure 1322 is shown in the illustrated example of FIG. 13. The example message structure 1322 includes a filter field that identifies the desired capabilities and/or type(s) of capabilities of the sink device (e.g., the desired capabilities determined in block 1310). In examples disclosed herein, the discovery message is implemented using a discover capabilities request.

In response to receipt of the discovery message, the example sink device 1304 identifies a list of capabilities that match the requested capability and/or capabilities, and responds with the list of corresponding capabilities. (Block 1330). An example message structure 1332 is shown in the illustrated example of FIG. 13 to represent the response message transmitted by the sink device 1304. The example message structure 1332 includes length, tag, and value (LTV) formatted data that represents an encoded list of capabilities of the sink device 1304 that match the requested capabilities. In the illustrated example of FIG. 13, the example message structure 1332 includes configuration parameters that identify which codecs (e.g., audio codecs) are available for each matching capability.

In examples disclosed herein, the sink device 1304 only responds when a capability requested by the source device 1302 is present at the sink device 1304. That is, if no corresponding capabilities are available, no response is transmitted. However, in some examples, the example sink device 1304 may respond with a message indicating that the requested capabilities are not available.

The example source device 1302 transmits a configuration request to the sink device 1304. (Block 1340). An example message structure 1342 is shown in the illustrated example of FIG. 13 that represents the requested configuration of the sink device 1304. In the illustrated example of FIG. 13, the example message structure 1342 requests that the sink device 1304 configure a particular capability using a selected media codec.

The example sink device 1304 applies the requested configuration. (Block 1350). An example data structure 1352 is shown in the illustrated example of FIG. 13 to represent the applied configuration. The example sink device 1304 stores the applied configuration. (Block 1355). An example data structure 1357 is shown in the illustrated example of FIG. 13 to represent the stored configuration. In the illustrated example of FIG. 13, the data structure 1357 includes a configuration ID and corresponding configuration parameters. The example sink device 1304 then acknowledges the configuration to the source device. (Block 1360). In acknowledging the configuration, the example sink device 1304 informs the source device 1302 of the configuration ID stored in the example data structure 1357 and the corresponding configuration parameters. In some examples, the sink device 1304 transmits the entirety of the data structure 1357 to the source device 1302.

The example source device 1302 then stores a record of the acknowledged configuration. (Block 1370). An example data structure 1372 is shown in the illustrated example of FIG. 13 to represent the configuration information provided by the source device 1304. Storing the configuration ID and configuration parameters enables the source device 1302, upon attempting to re-establish a connection with the sink device 1304, to re-use the previously stored configuration without having to re-discover the capabilities of the sink device 1304.

Figure 14:
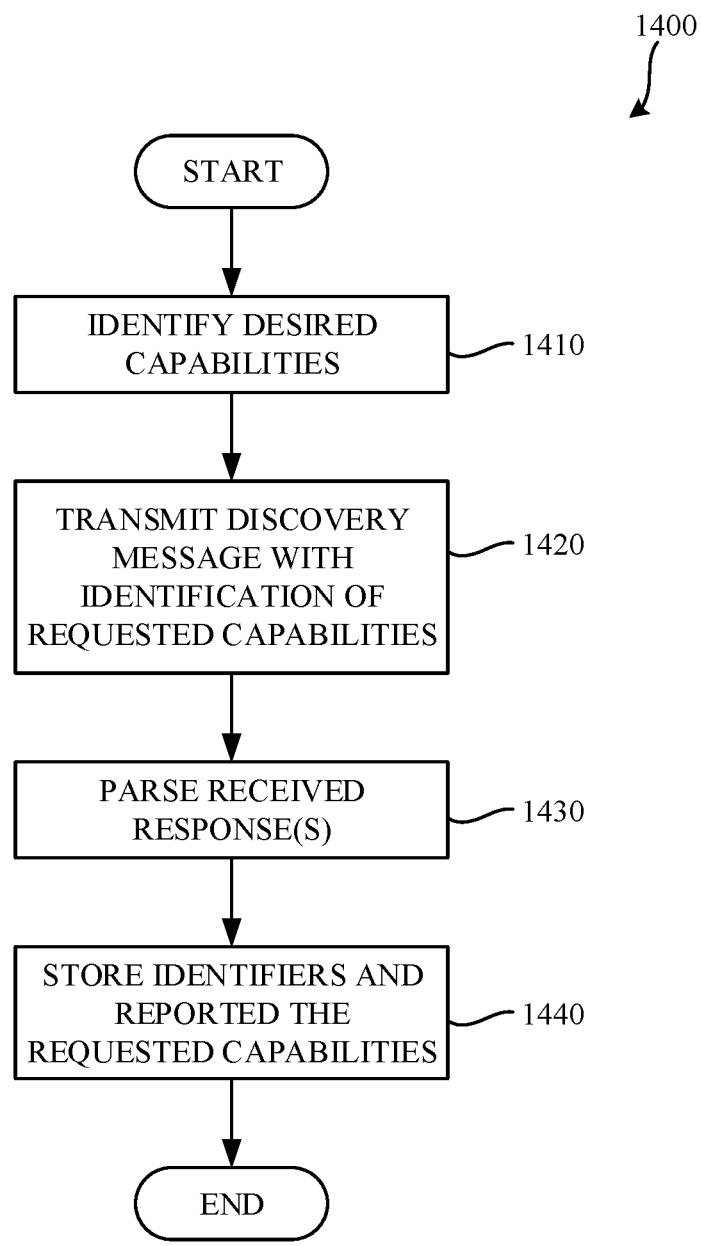
FIG. 14 is a flowchart representative of example machine-readable instructions which, when executed, cause the example source device to discover capabilities of the example sink device.

FIG. 14 is a flowchart representative of example machine-readable instructions which, when executed, cause the example source device to discover capabilities of the example sink device. As noted above, the example source device may be implemented by the example device 300 of FIG. 3. The example process 1400 of the illustrated example of FIG. 14 begins when the example capability discoverer 320 identifies one or more desired capabilities. (Block 1410). In examples disclosed herein, the desired capabilities are based on one or more requests, features, and/or functionality provided and/or received from the native device functionality 350. The example capability discoverer 320 transmits, via the antenna(s) 310, a discovery message with an identification of the requested capabilities. (Block 1420). The example capability discoverer 320 then awaits a response.

The example capability discoverer 320 parses any received responses. (Block 1430). In examples disclosed herein, the received responses are formatted using a length, tag, and value (LTV) format. Thus, multiple different capabilities can be reported via a single response message. However, any other response message format may additionally or alternatively be used. The example capability discoverer 320 stores corresponding identifiers of devices that reported their corresponding capabilities in the example configuration memory 325. (Block 1440). The example connection manager 330 may then use the information stored in the example configuration memory 325 when requesting that the sink device apply and/or store a particular configuration.

Figure 15:
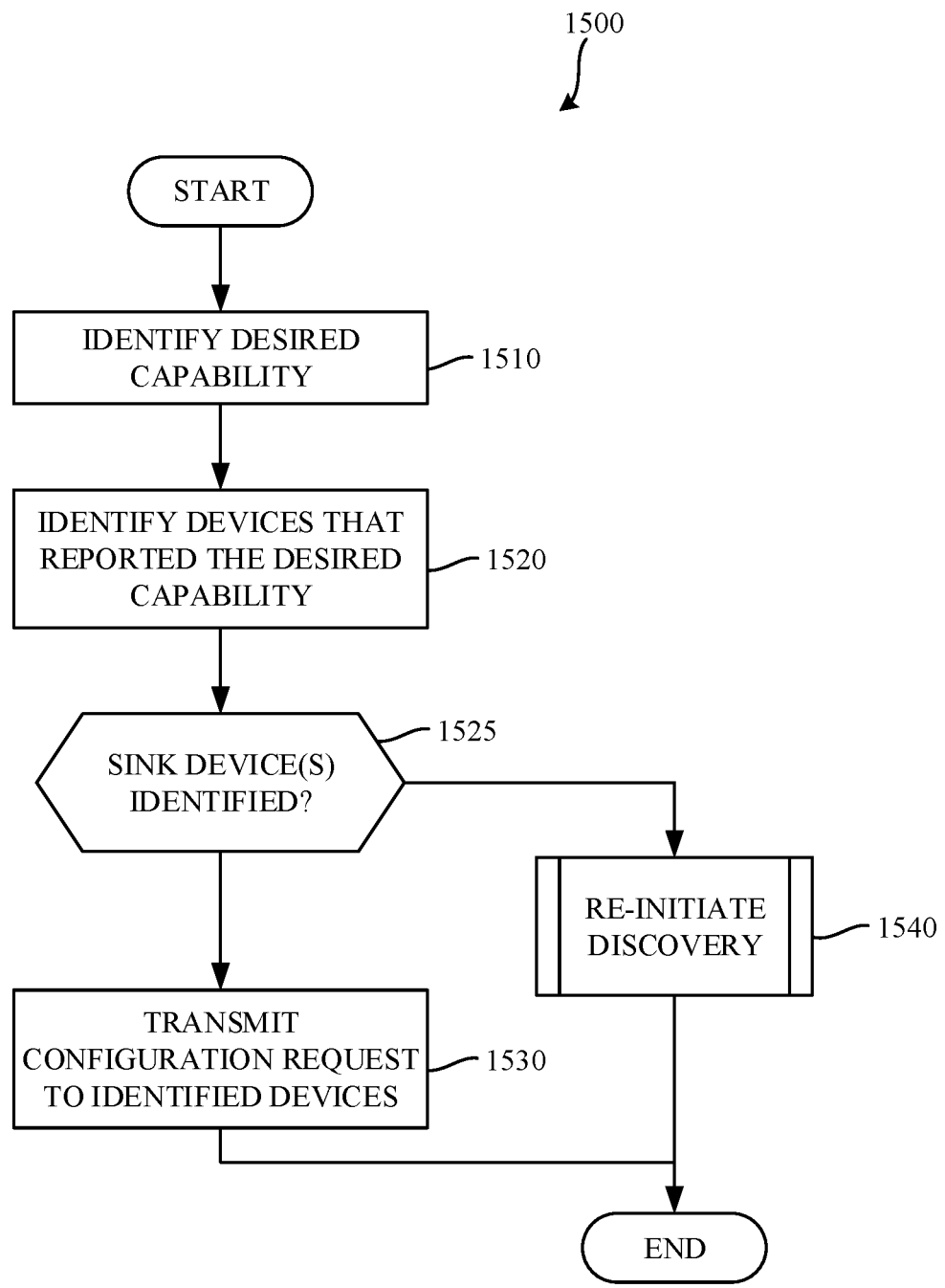
FIG. 15 is a flowchart representative of example machine-readable instructions which, when executed, cause the example source device to request initiation of a connection.

FIG. 15 is a flowchart representative of example machine-readable instructions which, when executed, cause the example source device to request initiation of a connection. The example process 1500 of the illustrated example of FIG. 15 begins when the example connection manager 330 identifies a desired capability. (Block 1510). In examples disclosed herein, the desired capability is identified based on one or more requests, features, and/or functionality provided by and/or received from the native device functionality 350. The example connection manager 330 reviews the configuration memory 325 to identify sink devices that had previously reported the desired capability. (Block 1520). The example connection manager 330 determines whether any sink devices were identified. (Block 1525). If one or more sink devices were identified (e.g., block 1525 returns a result of YES), the example connection manager 330 transmits one or more configuration requests to those identified devices. (Block 1530). If no sink devices were identified (e.g., block 1525 returns a result of NO), the example connection manager 330 reinitiates the discovery process described in FIG. 14. Re-initiating the discovery process described in FIG. 14 causes matching capabilities of nearby sink devices to be re-discovered. The example connection process of FIG. 15 may be then repeated once one or more devices with the desired capability are detected.

Figure 16:
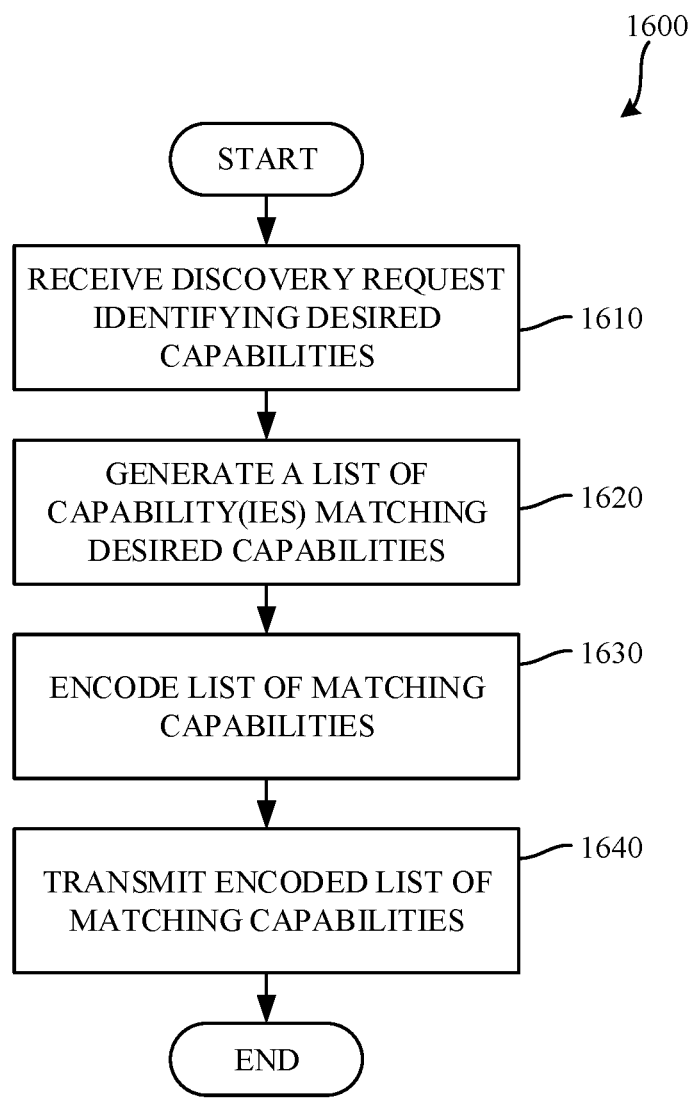
FIG. 16 is a flowchart representative of example machine-readable instructions which, when executed, cause the example sink device to provide a list of matching capabilities in response to a request to discover capabilities received from the source device.

FIG. 16 is a flowchart representative of example machine-readable instructions which, when executed, cause the example sink device to provide a list of matching capabilities in response to a request to discover capabilities received from the source transceiver. As noted above, the example sink device may be implemented by the example device 300 of FIG. 3. The example process 1600 of the illustrated example of FIG. 16 begins when the example connection manager 330 of a sink device receives a discovery request identifying capabilities desired by a source device. (Block 1610).

The example connection manager 330 generates a list of capabilities that match the desired capabilities provided by the source device. (Block 1620). In examples disclosed herein, the example connection manager 330 identifies those capabilities that match the desired capabilities by interfacing with the example native device functionality 350 to determine features, functionalities, etc. that are provided by the native device functionality 350. The example connection manager 330 encodes the list of matching capabilities. (Block 1630). In examples disclosed herein, the matching capabilities are encoded in an LTV format. However, any other encoding format may additionally or alternatively be used. The example connection manager 330 then transmits the encoded list of matching capabilities to the requesting source device. (Block 1640). In examples disclosed herein, the connection manager 330 transmits the encoded list of matching capabilities to the requesting source device using a single message. However, in some examples, multiple messages may be used to transmit the complete list of encoded matching capabilities.

Figure 17:
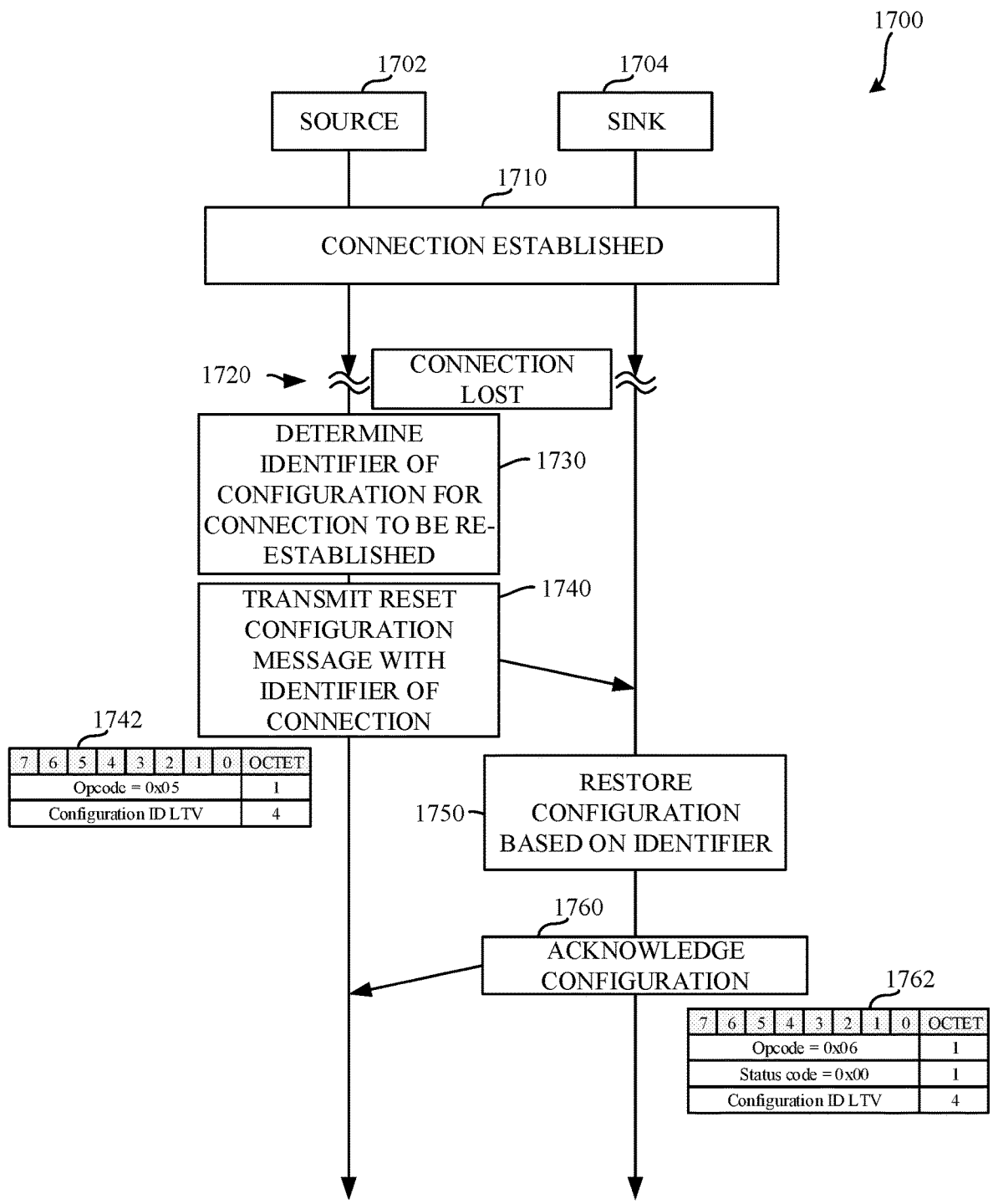
FIG. 17 is a communication diagram representing example communications between an example source device and an example sink device to establish and/or re-establish a connection.

FIG. 17 is a communication diagram 1700 representing example communications between an example source device 1702 and an example sink device 1704 that may be used to establish and/or re-establish a connection. The example communication diagram 1700 begins with a prior connection having been established between the source device 1702 and the sink device 1704. (Block 1710). In the illustrated example of FIG. 17, the prior connection between the source device 1702 and the sink device 1704 is then lost. (Block 1720). While in the illustrated example of FIG. 17, the connection process is described in the context of re-establishing a lost connection, such a connection process may be used even when a previously established connection does not exist (e.g., in a zero-configuration scenario, as described in connection with FIG. 12). Ordinarily, in such a situation, the source device and/or the sink device would initiate the reconnection process by attempting to re-discover the capabilities of the sink device, negotiating a configuration for the re-establishment of the connection, and finally restoring the newly configured connection.

In the illustrated example of FIG. 17, the example source device 1702 determines an identifier of the connection that was lost. (Block 1730). The example source device 1702 determines an identifier of the connection by inspecting the configuration memory 325. The example source device 1702 transmits a reset configuration message with an identifier of the configuration to be used for the renewed connection (e.g., an identifier of the configuration that was previously used for the connection). (Block 1740). An example message structure 1742 is shown in the illustrated example of FIG. 17 to represent the reconfiguration message transmitted by the source device 1702. Having previously stored the configuration that is to be used (e.g., as described in connection with block 1355 of FIG. 13), the example sink device may, instead of having to undergo the discovery and configuration phase(s), restore the configuration based on the provided identifier. (Block 1750). The example sink device 1702 then acknowledges the configuration that had been applied. (Block 1760). An example message structure 1762 is shown in the illustrated example of FIG. 17 to represent the acknowledgment of the applied configuration sent from the sink device 1704 to the source device 1702.

While in the illustrated example of FIG. 17 the source device reinitiates the connection, the roles of the source device and the sink device may be reversed. For example, the sink device 1704 may initiate the reconnection procedure.

As discussed in connection with FIG. 12, in some examples a fixed configuration may be used. Thus, instead of the source device 1702 determining an identifier of a prior configuration that is to be reapplied (e.g., as is done in block 1730), the identifier of the configuration for the connection to be re-established may be an identifier of a fixed configuration.

Figure 18:
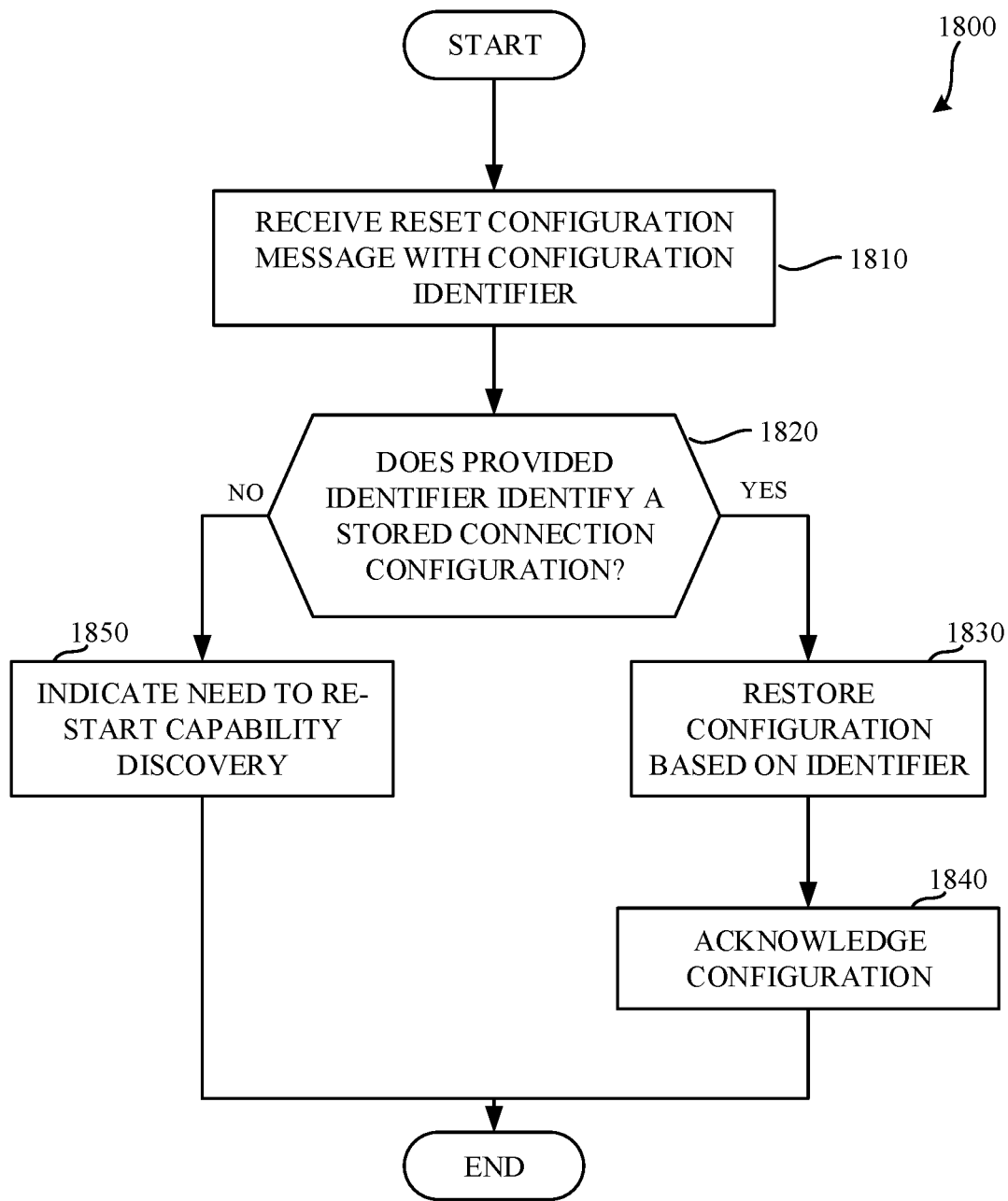
FIG. 18 is a flowchart representative of example machine-readable instructions which, when executed, cause the example sink device to restore a prior connection configuration.

FIG. 18 is a flowchart representative of example machine-readable instructions which, when executed, cause the example sink transceiver to restore a configuration based on a provided configuration identifier. The example process 1800 of the illustrated example of FIG. 18 begins when the example connection manager 330 receives a reset configuration message that includes a configuration identifier identifying the configuration be used. (Block 1810). The example connection manager 330 determines whether the provided configuration identifier identifies a stored connection configuration by inspecting the configuration memory 325 for a stored configuration that uses the provided configuration identifier. (Block 1820).

In some examples, the connection configuration identifier identifies a fixed configuration (e.g., a configuration that is permanently stored in the configuration memory 325). In some examples, the connection configuration identifier identifies a configuration that was previously used to communicate between the source device in the sink device. If the example connection manager 330 determines that the provided configuration identifier does not identify a stored connection configuration (e.g., block 1820 returns result of NO), the example connection manager 330 transmits a message indicating that no stored connection configuration was found and that capability discovery must be restarted. (Block 1850). In the context of FIG. 12, such an approach is commensurate with the sink device returning to the idle state 1210 via edge 1272, and subsequently attempting to move along edge 1250 to re-configure the connection. In streaming media implementations, such connections will have been previously used and/or configured, resulting in many attempts to identify a previously stored connection configuration being successful. As a result, the amount of time and/or resources required to re-establish such connections is reduced.

Returning to block 1820, if the example connection manager 330 determines that the provided configuration identifier identifies a configuration that is stored in the example configuration memory 325 (e.g., a fixed configuration or a configuration stored based on a previous connection), the example connection manager 330 restores the configuration. (Block 1830). The example connection manager 330 then acknowledges the configuration. (Block 1840). The example process 1800 of the illustrated example of FIG. 18 then terminates.

Figure 19:
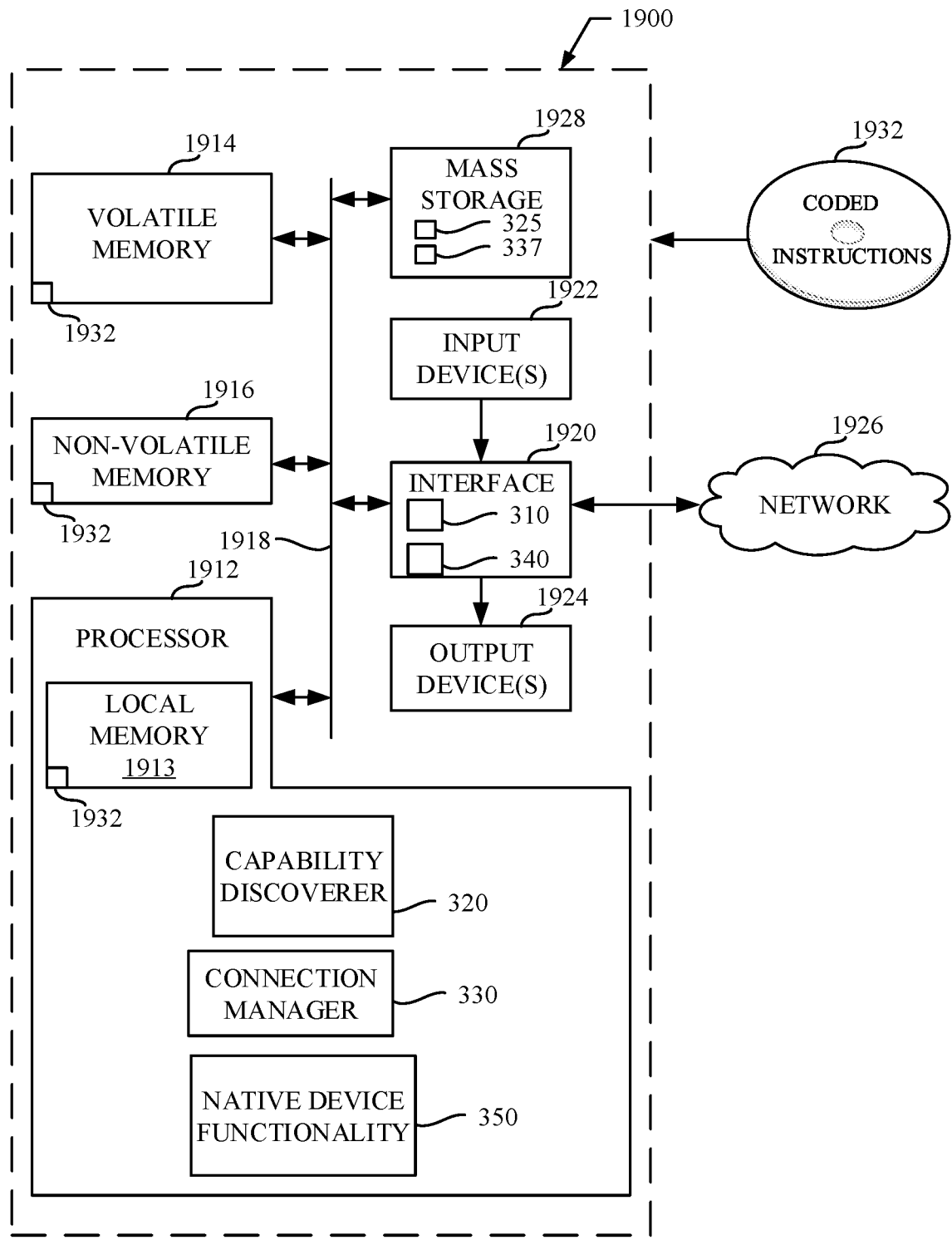
FIG. 19 is a block diagram of an example processing platform structured to execute the instructions of FIGS. 8, 13, 14, 15, 16, 17, and/or 18 to implement the example transceiver of FIG. 3.

FIG. 19 is a block diagram of an example processor platform 1900 capable of executing the instructions of FIGS. 8, 13, 14, 15, 16, 17, and/or 18 to implement the example device 300 of FIG. 3. The processor platform 1900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1900 of the illustrated example includes a processor 1912. The processor 1912 of the illustrated example is hardware. For example, the processor 1912 can be implemented by one or more integrated circuits, logic circuits, microprocessors or controllers from any desired family or manufacturer. The hardware processor may be a semiconductor based (e.g., silicon based) device. In this example, the processor 1912 implements the example capability discoverer 320, the example connection manager 330, and the example native device functionality 350.

The processor 1912 of the illustrated example includes a local memory 1913 (e.g., a cache). The processor 1912 of the illustrated example is in communication with a main memory including a volatile memory 1914 and a non-volatile memory 1916 via a bus 1918. The volatile memory 1914 may be implemented by Synchronous Dynamic Random-dom Access Memory (SDRAM), Dynamic Random Access Memory (DRAM), RAMBUS Dynamic Random Access Memory (RDRAM) and/or any other type of random access memory device. The non-volatile memory 1916 may be implemented by flash memory and/or any other desired type of memory device. Access to the main memory 1914, 1916 is controlled by a memory controller.

The processor platform 1900 of the illustrated example also includes an interface circuit 1920. The interface circuit 1920 may be implemented by any type of interface standard, such as an Ethernet interface, a universal serial bus (USB), and/or a PCI express interface.

In the illustrated example, one or more input devices 1922 are connected to the interface circuit 1920. The input device(s) 1922 permit(s) a user to enter data and/or commands into the processor 1912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1924 are also connected to the interface circuit 1920 of the illustrated example. The output devices 1924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1920 of the illustrated example, thus, typically includes a graphics driver card, a graphics driver chip and/or a graphics driver processor.

The interface circuit 1920 of the illustrated example also includes a communication device such as a transmitter, a receiver, a transceiver, a modem and/or network interface card to facilitate exchange of data with external machines (e.g., computing devices of any kind) via a network 1926 (e.g., an Ethernet connection, a digital subscriber line (DSL), a telephone line, coaxial cable, a cellular telephone system, etc.). In examples disclosed herein, the example interface circuit implements the one or more antenna(s) 310, and/or the example data interface 340.

The processor platform 1900 of the illustrated example also includes one or more mass storage devices 1928 for storing software and/or data. Examples of such mass storage devices 1928 include floppy disk drives, hard drive disks, compact disk drives, Blu-ray disk drives, RAID systems, and digital versatile disk (DVD) drives. In examples disclosed herein, the example mass storage devices 1928 implement the example configuration memory 325 and/or the example retry counter 337.

The coded instructions 1932 of FIGS. 8, 13, 14, 15, 16, 17, and/or 18 may be stored in the mass storage device 1928, in the volatile memory 1914, in the non-volatile memory 1916, and/or on a removable tangible computer readable storage medium such as a CD or DVD.

From the foregoing, it will be appreciated that example methods, apparatus, and articles of manufacture have been disclosed that reduce an amount of time required to establish a connection by using a fixed configuration, which enables a zero-configuration solution. Some example approaches disclosed herein reduce an amount of time required to establish a connection by storing previously used connection configuration information, thereby reducing the need to re-discover capabilities when initiating a connection. In some examples, that stored connection configuration information can be used to more quickly re-establish a prior isochronous link.

Moreover, some example approaches disclosed herein utilize a multicast transmission acknowledgment scheme where the source device orchestrates acknowledgments from the sink devices when data is transmitted via a shared multicast channel. Using such an approach decreases power consumption at the source device. The order of magnitude of the power reduction can reach 1/N, where N is the number of sink devices. For example, in a mono speech voice call with two earbuds (two devices), half of the power is consumed using example approaches disclosed herein, as compared to if such approaches were not used. In a stereo codec arrangement where audio is transmitted to four speakers (e.g., four devices), one fourth of the power is consumed using example approaches disclosed herein, as compared to if such approaches were not used.

Example 1 includes an apparatus to establish a connection, the apparatus comprising a configuration memory to store a configuration parameter identified by a corresponding configuration identifier, and a connection manager to access a request to set up an isochronous link between the apparatus and a Bluetooth device, the request including a requested configuration identifier, the connection manager to determine whether the requested configuration identifier is stored in the configuration memory, the connection manager to, in response to determining that the requested configuration identifier is stored in the configuration memory, open the isochronous link using the configuration parameter associated with the configuration identifier.

Example 2 includes the apparatus of example 1, wherein the requested configuration identifier corresponds to a fixed configuration.

Example 3 includes the apparatus of example 1, wherein the connection manager is to store the configuration identifier and the corresponding configuration parameter in the configuration memory in response to a prior isochronous link having been established.

Example 4 includes the apparatus of example 3, wherein the request to set up the isochronous link is a request to re-establish the prior isochronous link.

Example 5 includes the apparatus of example 1, wherein the connection manager is further to, in response to determining that the configuration identifier is not stored in the configuration memory, transmit a message instructing the Bluetooth device to restart a capability discovery process.

Example 6 includes the apparatus of example 1, wherein the request is a first request, and the connection manager is further to receive a discovery request including a filter indicating one or more requested capabilities.

Example 7 includes the apparatus of example 6, wherein the connection manager is further to generate, in response to receipt of the discovery request, a list of capabilities matching the one or more requested capabilities, encode the list of capabilities matching the one or more requested capabilities, and transmit the encoded list of matching capabilities to the Bluetooth device.

Example 8 includes the apparatus of example 7, wherein the list of capabilities is encoded using a length, tag, and value encoding format.

Example 9 includes at least one tangible machine-readable storage medium comprising instructions that, when executed, cause a machine to at least access a request received from a Bluetooth device, the request requesting set up of an isochronous link between the machine and the Bluetooth device, the request including a configuration identifier, determine whether the configuration identifier identifies a configuration stored in a memory of the machine, open, in response to determining that the configuration identifier identifies the configuration stored in the memory, the isochronous link using the stored configuration.

Example 10 includes the at least one tangible machine-readable storage medium of example 9, wherein the stored configuration is a fixed configuration.

Example 11 includes the at least one tangible machine-readable storage medium of example 9, wherein the stored configuration is stored in a memory of the machine in response to a prior isochronous link having been established.

Example 12 includes the at least one tangible machine-readable storage medium of example 11, wherein the request to set up the isochronous link is a request to re-establish the prior isochronous link.

Example 13 includes the at least one tangible machine-readable storage medium of example 9, wherein the instructions, when executed, further cause the machine to, in response to determining that the configuration identifier does not identify the stored configuration, transmit a message instructing the Bluetooth device to restart a capability discovery process.

Example 14 includes the at least one tangible machine-readable storage medium of example 9, wherein the request is a first request, and the instructions, when executed, further cause the machine to access a discovery request transmitted by the Bluetooth device that includes a filter indicating one or more requested capabilities.

Example 15 includes the at least one tangible machine-readable storage medium of example 14, wherein the instructions, when executed, further cause the machine to generate, in response to receipt of the discovery request, a list of capabilities matching the one or more requested capabilities, encode the list of capabilities matching the one or more requested capabilities, and transmit the encoded list of matching capabilities to the Bluetooth device.

Example 16 includes the at least one tangible machine-readable storage medium of example 15, wherein the list of capabilities is encoded using a length, tag, and value encoding format.

Example 17 includes a method of establishing a connection, the method comprising accessing a request received at a first device from a second device, the request requesting set up of an isochronous link between the first device and the second device, the request including a configuration identifier, determining, by executing an instruction with a processor, whether the configuration identifier identifies a configuration stored at the first device, and in response to determining that the configuration identifier identifies the configuration stored at the first device, opening the isochronous link using the stored configuration.

Example 18 includes the method of example 17, wherein the stored configuration is a fixed configuration.

Example 19 includes the method of example 17, wherein the stored configuration is stored in a memory of the first device in response to a prior isochronous link having been established.

Example 20 includes the method of example 17, wherein the request to set up the isochronous link is a request to re-establish a prior isochronous link.

Example 21 includes the method of example 17, further including, in response to determining that the configuration identifier does not identify the configuration stored at the first device, transmitting a message instructing the second device to restart a capability discovery process.

Example 22 includes the method of example 17, wherein the request is a first request, and further including receiving, at the first device from the second device, a discovery request that includes a filter indicating one or more requested capabilities.

Example 23 includes the method of example 22, further including generating, in response to receipt of the discovery request, a list of capabilities matching the one or more requested capabilities, encoding the list of capabilities matching the one or more requested capabilities, transmitting the encoded list of matching capabilities to the second device.

Example 24 includes the method of example 23, wherein the list of capabilities is encoded using a length, tag, and value encoding format.

Example 25 includes an apparatus to establish a connection, the apparatus comprising storage means for storing a configuration parameter identified by corresponding configuration identifier, and connection management means for accessing a request to set up an isochronous link between the apparatus and a Bluetooth device, the request including a requested configuration identifier, the connection management means to determine whether the requested configuration identifier is stored in the configuration memory, the connection manager to, in response to determining that the requested configuration identifier is stored in the storage means, open the isochronous link using the configuration parameter associated with the configuration identifier.

Example 26 includes the apparatus of example 25, wherein the requested configuration identifier corresponds to a fixed configuration.

Example 27 includes the apparatus of example 25, wherein the connection management means is to store the configuration identifier and the corresponding configuration parameter in the storage means in response to a prior isochronous link having been established.

Example 28 includes the apparatus of example 27, wherein the request to set up the isochronous link is a request to re-establish the prior isochronous link.

Example 29 includes the apparatus of example 25, wherein the connection management means is further to, in response to determining that the configuration identifier is not stored in the storage means, transmit a message instructing the Bluetooth device to restart a capability discovery process.

Example 30 includes the apparatus of example 25, wherein the request is a first request, and the connection management means is further to receive a discovery request including a filter indicating one or more requested capabilities.

Example 31 includes the apparatus of example 30, wherein the connection management means is further to generate, in response to receipt of the discovery request, a list of capabilities matching the one or more requested capabilities, encode the list of capabilities matching the one or more requested capabilities, and transmit the encoded list of matching capabilities to the Bluetooth device.

Example 32 includes the apparatus of example 31, wherein the list of capabilities is encoded using a length, tag, and value encoding format.

Example 33 includes an apparatus to transmit multicast data via a Bluetooth connection, the apparatus comprising a configuration memory to store an access address identifying the multicast stream, the configuration memory to store a plurality of unique multicast identifiers corresponding to respective ones of a plurality of slave devices, and a connection manager to transmit data, via a single message, to the plurality of slave devices, the single message including a header indicating an order in which the plurality of slave devices are to acknowledge receipt of the single message.

Example 34 includes the apparatus of example 33, wherein the connection manager is further to, in response to a determination that one or more of the plurality of slave devices did not acknowledge receipt of the single message, attempt to re-transmit the data via a second message.

Example 35 includes the apparatus of example 34, further including a retry counter, the connection manager to increment the retry counter in response to transmitting the second message, the connection manager to attempt the re-transmission of the data until a the retry counter meets or exceeds a retry limit.

Example 33 includes an apparatus to transmit multicast data via a Bluetooth connection, the apparatus comprising a configuration memory to store an access address identifying the multicast stream, the configuration memory to store a plurality of unique multicast identifiers corresponding to respective ones of a plurality of slave devices, and a connection manager to transmit data, via a single message, to the plurality of slave devices, the single message including a header indicating an order in which the plurality of slave devices are to acknowledge receipt of the single message.

Example 34 includes the apparatus of example 33, wherein the connection manager is further to, in response to a determination that one or more of the plurality of slave devices did not acknowledge receipt of the single message, attempt to re-transmit the data via a second message.

Example 35 includes the apparatus of example 34, further including a retry counter, the connection manager to increment the retry counter in response to transmitting the second message, the connection manager to attempt the re-transmission of the data until a the retry counter meets or exceeds a retry limit.

Example 36 includes a method of transmitting multicast data via a Bluetooth connection, the method comprising informing a first slave device and a second slave device of an access address identifying the multicast stream, informing the first slave device of a first unique identifier assigned to the first slave device, informing the second slave device of a second unique identifier assigned to the second slave device, and transmitting a single multicast message to the first slave device and the second slave device, the single multicast message including the access address, and an identification of an order in which the first slave device and the second slave device are to acknowledge receipt of the single multicast message.

Example 37 includes the method of example 36, further comprising attempting, in response to a determination that at least one of the first device or the second device did not acknowledge receipt of the single multicast message, to re-transmit the data via a second message.

Example 38 includes the method of example 37, wherein the second message includes an identifier of the at least one of the first device or the second device that did not acknowledge receipt of the single multicast message.

Example 39 includes the method of example 36, further including incrementing a retry counter in response to the transmission of the second message, and attempting the re-transmission of the data until a the retry counter meets or exceeds a retry limit.

Example 40 includes at least one tangible machine-readable storage medium comprising instructions that, when executed, cause a machine to at least inform a first slave device and a second slave device of an access address identifying the multicast stream, inform the first slave device of a first unique identifier assigned to the first slave device, inform the second slave device of a second unique identifier assigned to the second slave device, and transmit a single multicast message to the first slave device and the second slave device, the single multicast message including the access address, and an identification of an order in which the first slave device and the second slave device are to acknowledge receipt of the single multicast message.

Example 41 includes the at least one tangible machine-readable storage medium of example 40, wherein the instructions, when executed, further cause the machine to, in response to a determination that at least one of the first device or the second device did not acknowledge receipt of the single multicast message, attempt to re-transmit the data via a second message.

Example 42 includes the at least one tangible machine-readable storage medium of example 41, wherein the second message includes an identifier of the at least one of the first device or the second device that did not acknowledge receipt of the single multicast message.

Example 43 includes the at least one tangible machine-readable storage medium of example 40, wherein the instructions, when executed, further cause the machine to increment a retry counter in response to the transmission of the second message; and attempt the re-transmission of the data until a the retry counter meets or exceeds a retry limit.

It is noted that this patent claims priority from Indian Patent Application Serial Number 201741034135, which was filed on Sep. 26, 2017, and is hereby incorporated by reference in its entirety.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. An apparatus to establish a connection, the apparatus comprising:
   a configuration memory to store a connection configuration parameter identified by a corresponding configuration identifier; and
   a connection manager to:
      access a request to set up an isochronous link between the apparatus and a Bluetooth device, the request including a requested configuration identifier;
      store the requested configuration identifier and the corresponding connection configuration parameter in the configuration memory in response to a prior isochronous link having been established;
      determine whether the requested configuration identifier is stored in the configuration memory; and
      in response to determining that the requested configuration identifier is stored in the configuration memory, open the isochronous link using the connection configuration parameter associated with the requested configuration identifier.

2. The apparatus of claim 1, wherein the requested configuration identifier corresponds to a fixed configuration.

3. The apparatus of claim 1, wherein the request to set up the isochronous link is a request to re-establish the prior isochronous link.

4. The apparatus of claim 1, wherein the connection manager is further to, in response to determining that the requested configuration identifier is not stored in the configuration memory, transmit a message instructing the Bluetooth device to restart a capability discovery process.

5. The apparatus of claim 1, wherein the request is a first request, and the connection manager is further to receive a discovery request including a filter indicating one or more requested capabilities.

6. The apparatus of claim 5, wherein the connection manager is further to generate, in response to receipt of the discovery request, a list of capabilities matching the one or more requested capabilities, encode the list of capabilities matching the one or more requested capabilities, and transmit the encoded list of matching capabilities to the Bluetooth device.

7. The apparatus of claim 6, wherein the list of capabilities is encoded using a length, tag, and value encoding format.

8. At least one non-transitory machine-readable storage medium comprising instructions that, when executed, cause a machine to at least:
   access a request received from a Bluetooth device, the request requesting set up of an isochronous link between the machine and the Bluetooth device, the request including a configuration identifier;
   store the requested configuration identifier and the corresponding connection configuration parameter in the configuration memory in response to a prior isochronous link having been established;
   determine whether the configuration identifier identifies a configuration stored in a memory of the machine; and
   open, in response to determining that the configuration identifier identifies the configuration stored in the memory, the isochronous link using the stored configuration.

9. The at least one non-transitory machine-readable storage medium of claim 8, wherein the stored configuration is a fixed configuration.

10. The at least one non-transitory machine-readable storage medium of claim 8, wherein the request to set up the isochronous link is a request to re-establish the prior isochronous link.

11. The at least one non-transitory machine-readable storage medium of claim 8, wherein the instructions, when executed, further cause the machine to, in response to determining that the configuration identifier does not identify the stored configuration, transmit a message instructing the Bluetooth device to restart a capability discovery process.

12. The at least one non-transitory machine-readable storage medium of claim 8, wherein the request is a first request, and the instructions, when executed, further cause the machine to access a discovery request transmitted by the Bluetooth device that includes a filter indicating one or more requested capabilities.

13. The at least one non-transitory machine-readable storage medium of claim 12, wherein the instructions, when executed, further cause the machine to:
   generate, in response to receipt of the discovery request, a list of capabilities matching the one or more requested capabilities;

encode the list of capabilities matching the one or more requested capabilities; and transmit the encoded list of matching capabilities to the Bluetooth device.

14. The at least one non-transitory machine-readable storage medium of claim 13, wherein the list of capabilities is encoded using a length, tag, and value encoding format.

15. A method of establishing a connection, the method comprising:
- accessing a request received at a first device from a second device, the request requesting set up of an isochronous link between the first device and the second device, the request including a configuration identifier;
- storing the requested configuration identifier and the corresponding connection configuration parameter in the configuration memory in response to a prior isochronous link having been established;
- determining, by executing an instruction with a processor, whether the configuration identifier identifies a configuration stored at the first device; and
- in response to determining that the configuration identifier identifies the configuration stored at the first device, opening the isochronous link using the stored configuration.

16. The method of claim 15, wherein the stored configuration is a fixed configuration.

17. The method of claim 15, wherein the request to set up the isochronous link is a request to re-establish a prior isochronous link.

18. The method of claim 15, further including, in response to determining that the configuration identifier does not identify the configuration stored at the first device, transmitting a message instructing the second device to restart a capability discovery process.

19. The method of claim 15, wherein the request is a first request, and further including receiving, at the first device from the second device, a discovery request that includes a filter indicating one or more requested capabilities.

20. The method of claim 19, further including:
- generating, in response to receipt of the discovery request, a list of capabilities matching the one or more requested capabilities;
- encoding the list of capabilities matching the one or more requested capabilities; and
- transmitting the encoded list of matching capabilities to the second device.

21. The method of claim 20, wherein the list of capabilities is encoded using a length, tag, and value encoding format.

* * * * *